United States Patent
Yahata

(10) Patent No.: US 8,306,383 B2
(45) Date of Patent: Nov. 6, 2012

(54) DATA PROCESSOR AND HIERARCHY FOR RECORDING MOVING AND STILL PICTURE FILES

(75) Inventor: Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 1173 days.

(21) Appl. No.: 11/570,157

(22) PCT Filed: Jun. 8, 2005

(86) PCT No.: PCT/JP2005/010468
§ 371 (c)(1),
(2), (4) Date: Dec. 7, 2006

(87) PCT Pub. No.: WO2005/122173
PCT Pub. Date: Dec. 22, 2005

(65) Prior Publication Data
US 2008/0259173 A1   Oct. 23, 2008

(30) Foreign Application Priority Data

Jun. 10, 2004 (JP) .................. 2004-173109

(51) Int. Cl.
| | |
|---|---|
| H04N 5/765 | (2006.01) |
| H04N 5/46 | (2006.01) |
| H04N 5/76 | (2006.01) |
| H04N 5/77 | (2006.01) |
| H04N 5/78 | (2006.01) |
| H04N 5/89 | (2006.01) |
| H04N 5/225 | (2006.01) |
| H04N 9/04 | (2006.01) |
| G09G 5/00 | (2006.01) |
| G11B 7/00 | (2006.01) |

(52) U.S. Cl. ........ 386/200; 386/224; 386/225; 386/293; 386/324; 386/334; 345/665; 348/207.99; 348/220.1; 348/231.2; 348/231.3; 348/231.4; 348/555; 348/558; 369/121

(58) Field of Classification Search .................. 386/46, 386/70, 83, 95, 117, 120, 125, E9.013; 345/665; 348/207.99, 220.1, 231.2, 231.3, 555, 558, 348/E5.024, 231.4; 369/121; 709/217; G9B/7.029, G9B/7.031, 7.088, 7.103, 7.134, 11.029, G9B/11.054, 27.019, 27.05, 27.012, 27.051, G9B/27.052

See application file for complete search history.

(56) References Cited

U.S. PATENT DOCUMENTS
6,285,826 B1    9/2001    Murase et al.
(Continued)

FOREIGN PATENT DOCUMENTS
EP    0 899 666    3/1999
(Continued)

OTHER PUBLICATIONS

Supplementary European Search Report for corresponding European Application No. EP 05 74 8909 dated Jun. 27, 2012.*

(Continued)

Primary Examiner — Thai Tran
Assistant Examiner — Syed Hasan
(74) Attorney, Agent, or Firm — Renner, Otto, Boisselle & Sklar, LLP

(57) ABSTRACT

To provide a data structure contributing to managing a moving picture and a still picture efficiently and also provide an apparatus for performing recording and/or playback using such a data structure.

A data processor includes: a drive unit for writing at least one still picture file on a level that is lower in hierarchy than a still picture folder of a storage medium; and a control section for generating file specifying information that specifies the storage location of each still picture file in the level and identification information for identifying each still picture file uniquely and for compiling a table that associates the file specifying information and the identification information with each other. The drive unit writes the table as a table file on the storage medium.

10 Claims, 27 Drawing Sheets

U.S. PATENT DOCUMENTS

| | | | |
|---|---|---|---|
| 6,930,976 B2 * | 8/2005 | Ogata | 369/275.3 |
| 7,373,391 B2 * | 5/2008 | Iinuma | 709/217 |
| 7,738,776 B2 * | 6/2010 | Kato et al. | 386/241 |
| 2003/0118327 A1 * | 6/2003 | Um et al. | 386/95 |
| 2004/0047592 A1 | 3/2004 | Seo et al. | |
| 2004/0105661 A1 | 6/2004 | Seo et al. | |
| 2004/0189827 A1 * | 9/2004 | Kim et al. | 348/231.4 |
| 2004/0234240 A1 | 11/2004 | Kurosawa et al. | |
| 2005/0201718 A1 | 9/2005 | Kato | |

FOREIGN PATENT DOCUMENTS

| | | |
|---|---|---|
| EP | 1 324 339 A2 | 7/2003 |
| JP | 2002-116946 | 4/2002 |
| JP | 2003-163866 | 6/2003 |
| JP | 2004-005344 | 1/2004 |
| JP | 2004-005934 | 1/2004 |
| JP | 2004-336566 | 11/2004 |
| WO | 2004/023479 A1 | 3/2004 |
| WO | 2004/023480 A1 | 3/2004 |

OTHER PUBLICATIONS

Notice of Reasons for Rejection for corresponding application No. JP2006-514534 issued May 26, 2009 and English language translation thereof.

Chinese Office Action for corresponding application No. 200580019168.6 issued Jun. 19, 2009 and English language translation thereof.

International Search Report for corresponding Application No. PCT/JP2005/010468 mailed Sep. 20, 2005.

* cited by examiner

FIG.3
(a) V_TSP
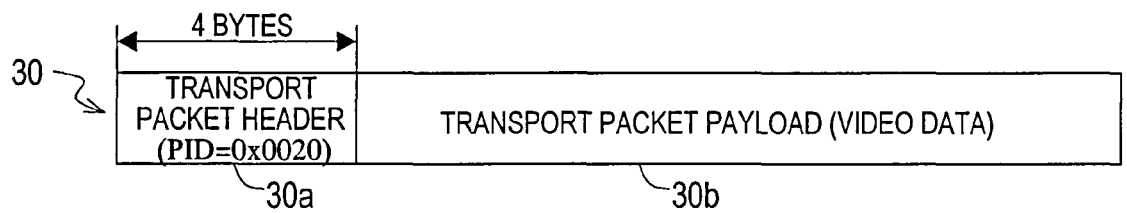
(b) A_TSP
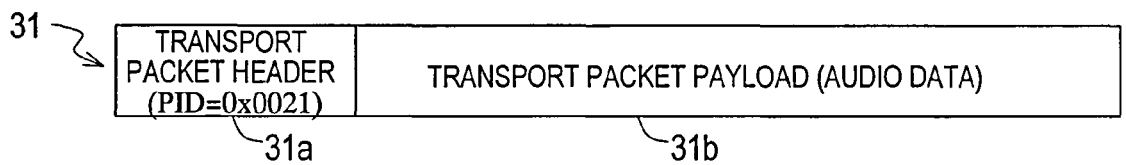

*FIG. 12* zzzzz.clpi()
- ..
- version_number
- ..
- ClipInfo()
- SequenceInfo()
- ProgramInfo()
- CPI()
- ClipMark()
- MakersPrivateData()

CPI()
- ..
- CPI_type
- if ( CPI_type == <EP_map> ){
- EP_map(){
- number_of_streams
- ..
- EP_map_for_one_stream()
- ..
- } else {
- TU_map()
- }

EP_map_for_one_stream()
- EP_fine_table_start_address
- for ( i=0 ; i<Nc ; i++ ){
- ref_to_EP_fine_id[i]
- PTS_EP_coarse[i]
- SPN_EP_coarse[i]
- }
- for ( j=0 ; j<Nf ; j++ ){
- ..
- I_end_position_offset[j]
- PTS_EP_fine[j]
- SPN_EP_fine[j]
- }

ClipMark()
- ..
- number_of_marks
- for ( i=0 ; i < number_of_marks ; i++ ){
- ..
- mark_type
- ref_to_STC_id
- mark_time_stamp
- entry_ES_PID
- ref_to_mark_thumbnail_index
- duration
- }

EP_MAP (PID=x)

| PTS | SPN No. |
|---|---|
| PTS (x1) | x1 |
| PTS (x2) | x2 |
| PTS (x3) | x3 |
| ..... | ..... |
| PTS (xk) | xk |

FIG.17
(a) 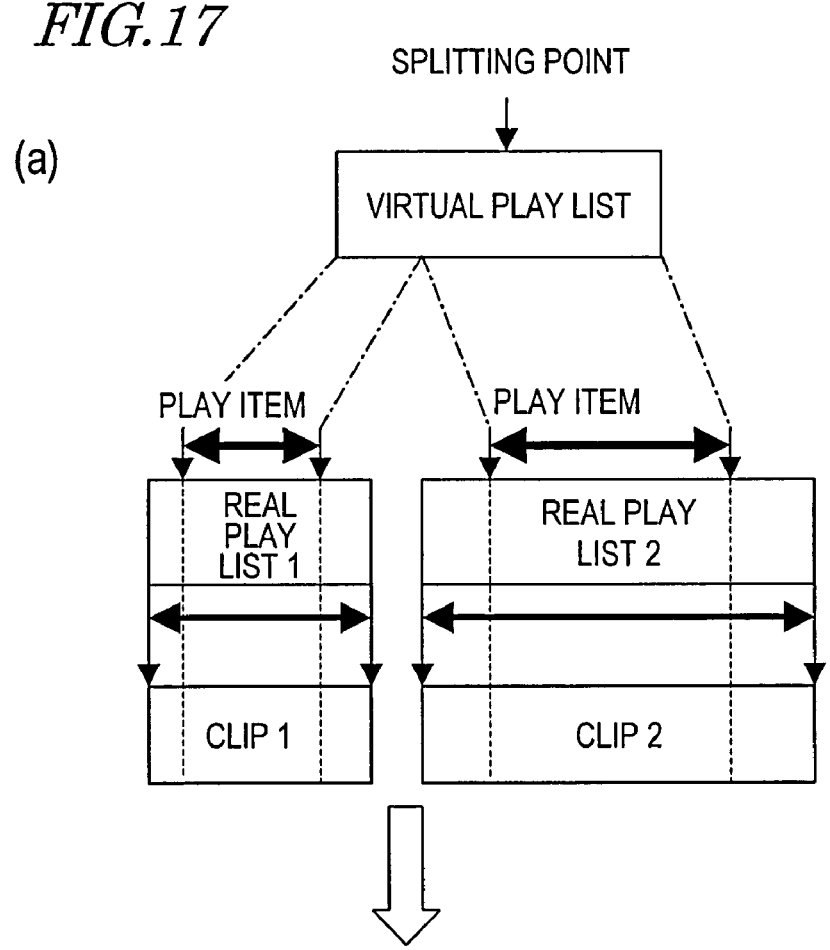
(b) 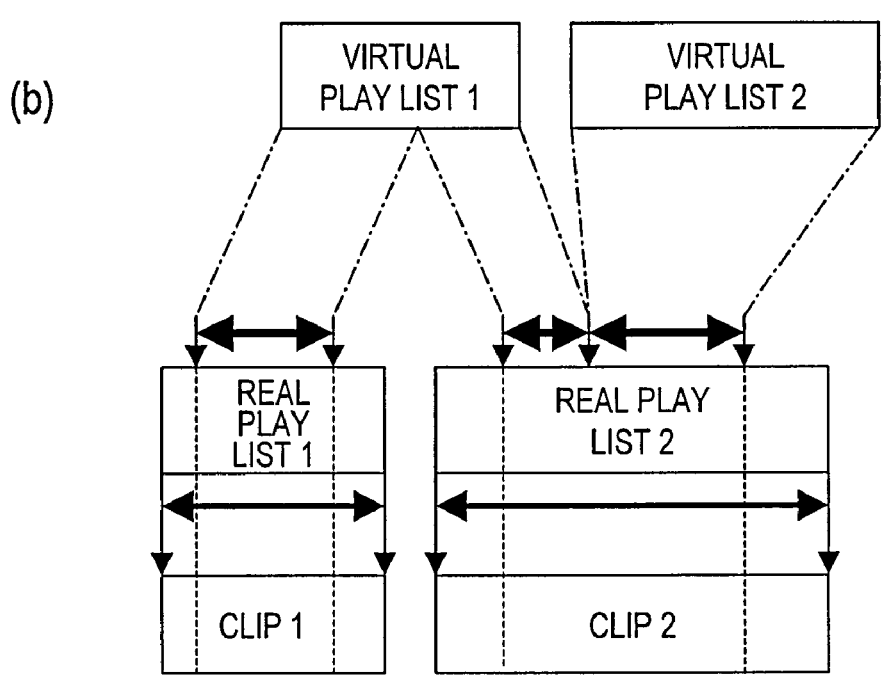

FIG.18
(a)
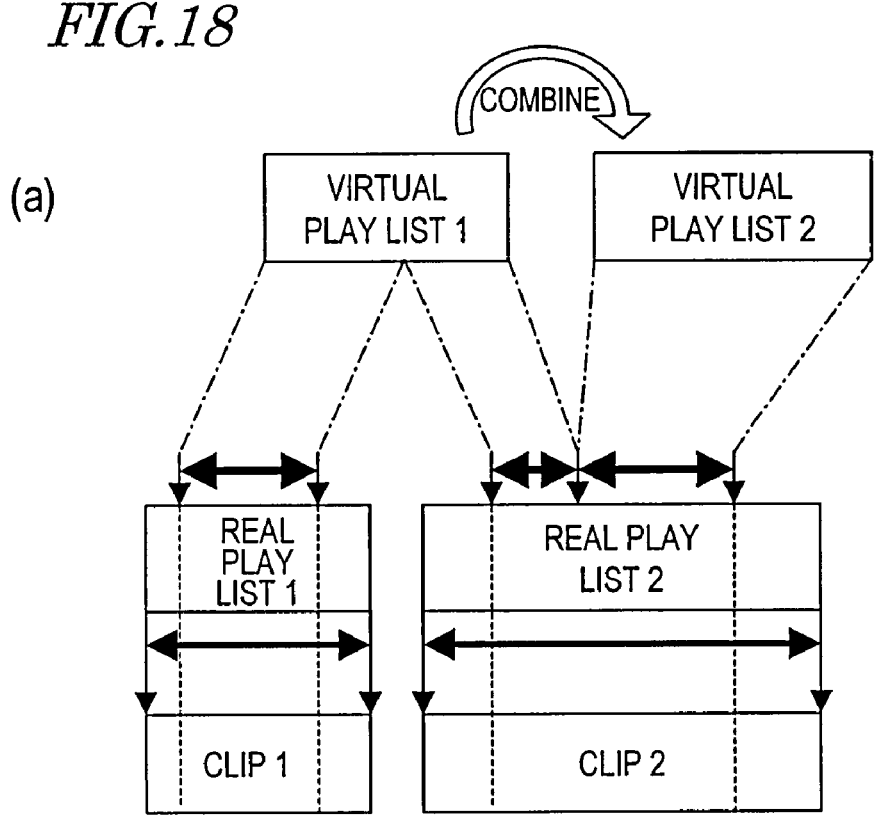
(b)
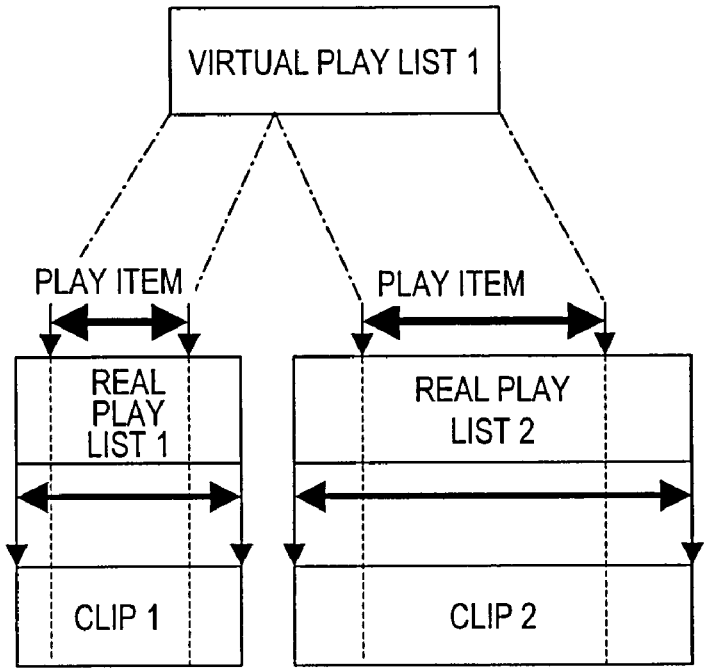

```
PlayListMark() {
    :
    number_of_marks
    for ( i=0 ; i < number_of_marks ; i++ ){
        :
        mark_type ( = AsynchronousStillMark )
        ref_to_PlayItem_id
        mark_time_stamp ( = 0, i.e. invalid )
        if ( mark_type == <menu_thumbnail> ){
            ref_to_menu_thumbnail_index
        } else if ( mark_type == <mark_thumbnail> ){
            ref_to_mark_thumbnail_index
        } else if ( mark_type ==
            <AsynchronousStillMark> || mark_type ==
            <SynchronousStillMark> )
            ref_to_still_picture_index
        }
        duration ( > 0 )
    }
}
```

(b)

```
PlayListMark() {
    :
    number_of_marks
    for ( i=0 ; i < number_of_marks ; i++ ){
        :
        mark_type ( = SynchronousStillMark )
        ref_to_PlayItem_id
        mark_time_stamp ( = a valid value )
        if ( mark_type == <menu_thumbnail> ){
            ref_to_menu_thumbnail_index
        } else if ( mark_type == <mark_thumbnail> ){
            ref_to_mark_thumbnail_index
        } else if ( mark_type == <AsynchronousStillMark> ||
            mark_type == <SynchronousStillMark> )
            ref_to_still_picture_index
        }
        duration ( > 0 )
    }
}
```

DATA PROCESSOR AND HIERARCHY FOR RECORDING MOVING AND STILL PICTURE FILES

TECHNICAL FIELD

The present invention relates to a technique of writing still picture data on a storage medium, on which moving picture data can be stored, and managing the data.

BACKGROUND ART

Recently, optical disk recorders for writing and storing video and audio digital data on an optical disk such as a DVD have become more and more popular. The targets of recording include a data stream representing a broadcast program and video and audio data streams that have been captured using a camcorder, for example. The user can write and store the data on a DVD in a randomly accessible state.

Optical disk recorders can write not only moving picture data streams but also still picture data on a DVD. If the user has shot a still picture using a digital still camera or a camcorder, the still picture data is written on a semiconductor memory card loaded there. Some optical disk recorders have a slot to load such a semiconductor memory card into the recorder. If the user removes a semiconductor memory card from a camcorder, for example, inserts the card into the slot, and then copies the still picture data onto a DVD that has been loaded in the optical disk recorder, the still picture data is stored on the DVD.

Regarding the techniques of writing still picture data on a storage medium, Design rule for Camera File system (DCF) standard was set and has become gradually known lately. The DCF standard defines the names and file formats of still picture files that can be written on a storage medium and a directory structure to store those files. For example, Patent Document No. 1 discloses the technique of bound-recording data compliant with the DCF standard. By establishing a directory and writing still picture data compliant with the DCF standard, the still picture data can always be read irrespective of the type of the storage medium and the manufacturer of the player.

As described above, not only moving picture data but also still picture data can be stored on a DVD. Thus, it would be very convenient for the user to make the contents of the data stored easily recognizable. That is why a lot of optical disk recorders provide some means for allowing the user to access his or her desired content very quickly by presenting either a thumbnail picture showing a scene of the moving picture data or still picture data in a reduced size on the menu screen that prompts the user to select a file to be read.

Patent Document No. 1: Japanese Patent Application Laid-Open Publication No. 2002-116946

DISCLOSURE OF INVENTION

Problems to be Solved by the Invention

The conventional optical disk recorders on the market present still pictures by running a program that carries out analysis compliant with the DCF standard. However, their processing is intended to process nothing more than still pictures, and therefore, allows just a little extension. For example, it has been impossible to present a thumbnail picture of moving picture data and still picture data (or a smaller sized picture thereof) on the same screen.

Technically, it is possible to create a program that presents a thumbnail picture of moving pictures and still picture data in parallel with each other. To realize both of these functions, however, the scale of the program becomes so large as to complicate the processing excessively and take a lot of time to see if the program works fine. Besides, the overall control of the optical disk recorder, including the execution of that program, becomes too complicated to perform management easily. That is why this is not an effective measure to solve the problem.

An object of the present invention is to manage still pictures using a data structure that allows a lot of extension. A more specific object of the present invention is to provide a data structure that contributes to managing moving pictures and still pictures efficiently and also provide an apparatus for performing read and/or write operation(s) using such a data structure.

Means for Solving the Problems

A data processor according to the present invention includes: a drive unit for writing at least one still picture file on a level that is lower in hierarchy than a still picture folder of a storage medium; and a control section for generating file specifying information that specifies the storage location of each said still picture file in the layer and identification information for identifying each said still picture file uniquely and for compiling a table that associates the file specifying information and the identification information with each other. The drive unit writes the table as a table file on the storage medium.

The control section may generate, as the file specifying information, path information about a path leading to each said still picture file in the layer and the file name of the still picture file.

The still picture folder includes a sub-folder, in which a number of still picture files are stored. For the still picture files, the control section may generate a piece of the path information about a path leading to each said sub-folder and the file names of the still picture files as the file specifying information.

The control section may generate a playlist for presenting still pictures selectively by using at least some of the at least one still picture file. The playlist includes an entry for specifying the respective still picture files to be used with the identification information. The drive unit may write the playlist as a playlist file on the storage medium.

The drive unit may write the playlist file on a reference folder, which is provided separately from the still picture folder.

The control section may store type information in each said entry of the playlist to indicate that the entry is related to presentation of only still picture files.

The control section may store presentation period information in each said entry of the playlist to define the presentation period of a still picture of its associated still picture file.

The reference folder includes a sub-folder, in which at least one moving picture file, containing moving picture data, is stored. The control section may further generate entries, which are provided for the respective moving picture files, in the playlist file. Each moving picture entry may include information about the file name of its associated moving picture file and the presentation start time and the presentation end time of the moving picture.

The control section may store type information, showing identity as an entry about synchronous playback of a moving picture and a still picture, in each entry of the playlist.

The control section may store time information, representing a still picture presentation time for presenting the still picture synchronously with the playback of the moving picture, in each entry of the playlist file. The time information may be defined based on the moving picture's time information that is added to the moving picture data to play back the moving picture.

The drive unit may write the at least one still picture file on the storage medium using a blue semiconductor laser.

The drive unit may write the at least one still picture file in the level that is lower in hierarchy than the still picture folder and that complies with the DCF standard.

Effects of the Invention

According to the present invention, an entry including identification information to identify a given still picture file is defined in a database file, which is stored in a different folder from that of the still picture file. By writing a table that associates the identification information with file specifying information to specify the still picture file in the hierarchy on a storage medium, the still picture file can be managed without directly processing the still picture file itself or the folder that stores that file. For example, by reference to the table with the identification information of the still picture to play back, the location of the still picture file in the hierarchy and its file name can be known. For instance, by adapting the format of the database file to an existing standard that was defined to process moving pictures, thumbnail pictures of moving picture data and still picture data (or smaller size pictures thereof) can be presented on the same screen.

BRIEF DESCRIPTION OF DRAWINGS

FIG. 3(a) shows the data structure of a video TS packet 30 and FIG. 3(b) shows the data structure of an audio TS packet 31.

Figure 4:
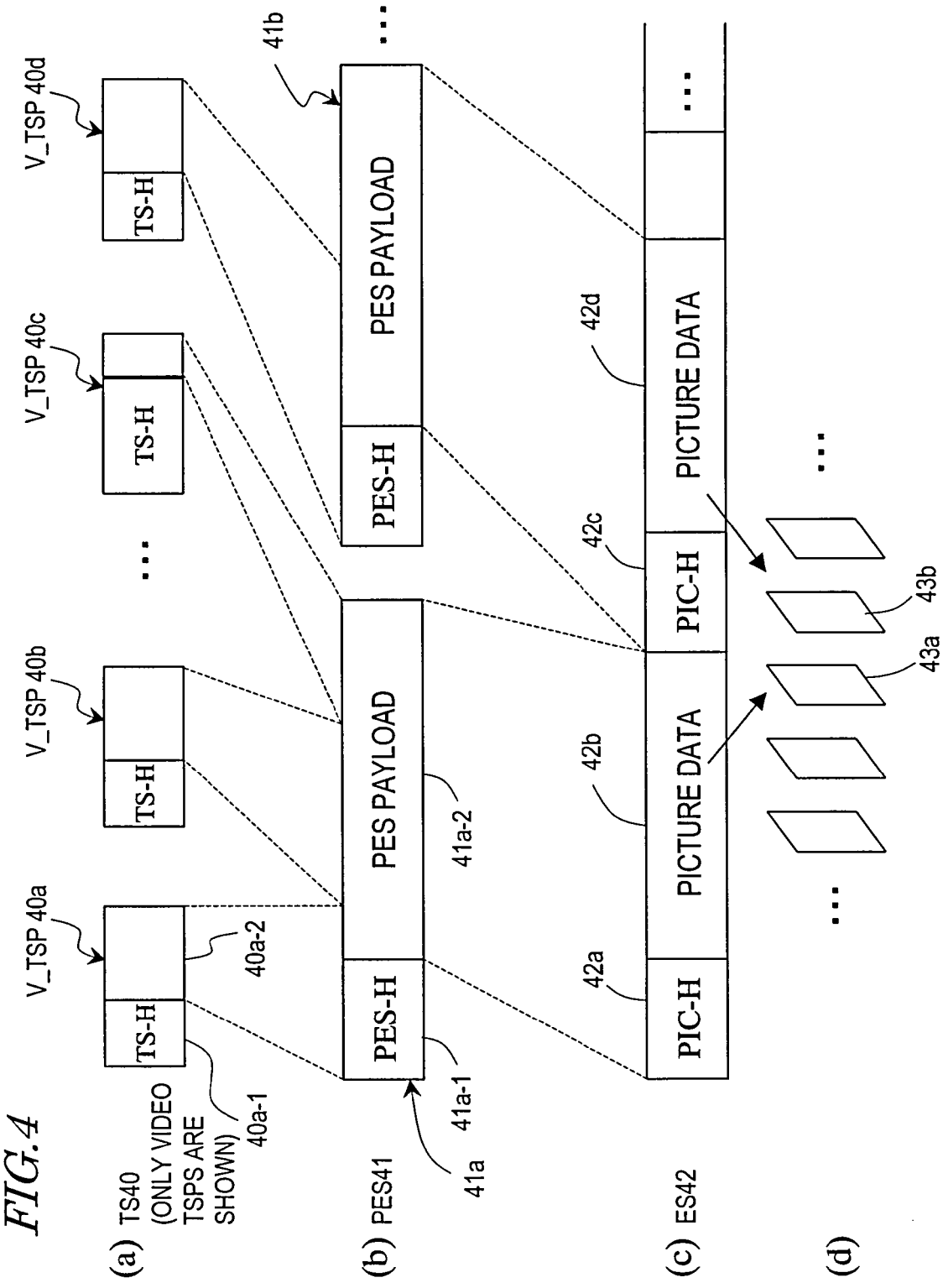

Portions (a) to (d) of FIG. 4 show the makeup of a stream when video pictures are played back from video TS packets.

Figure 5:
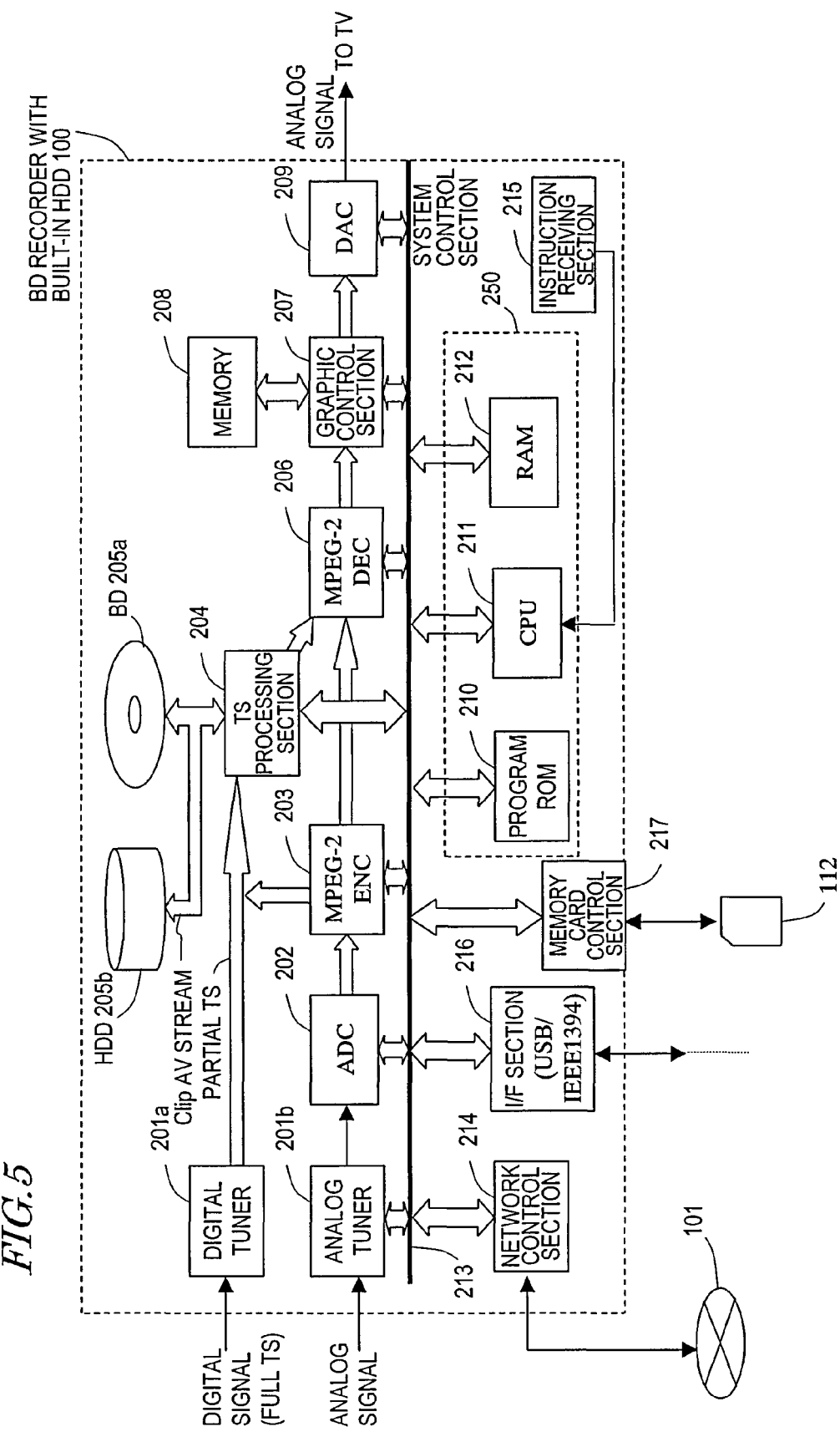

FIG. 5 shows an arrangement of functional blocks in the recorder 100.

Figure 6:
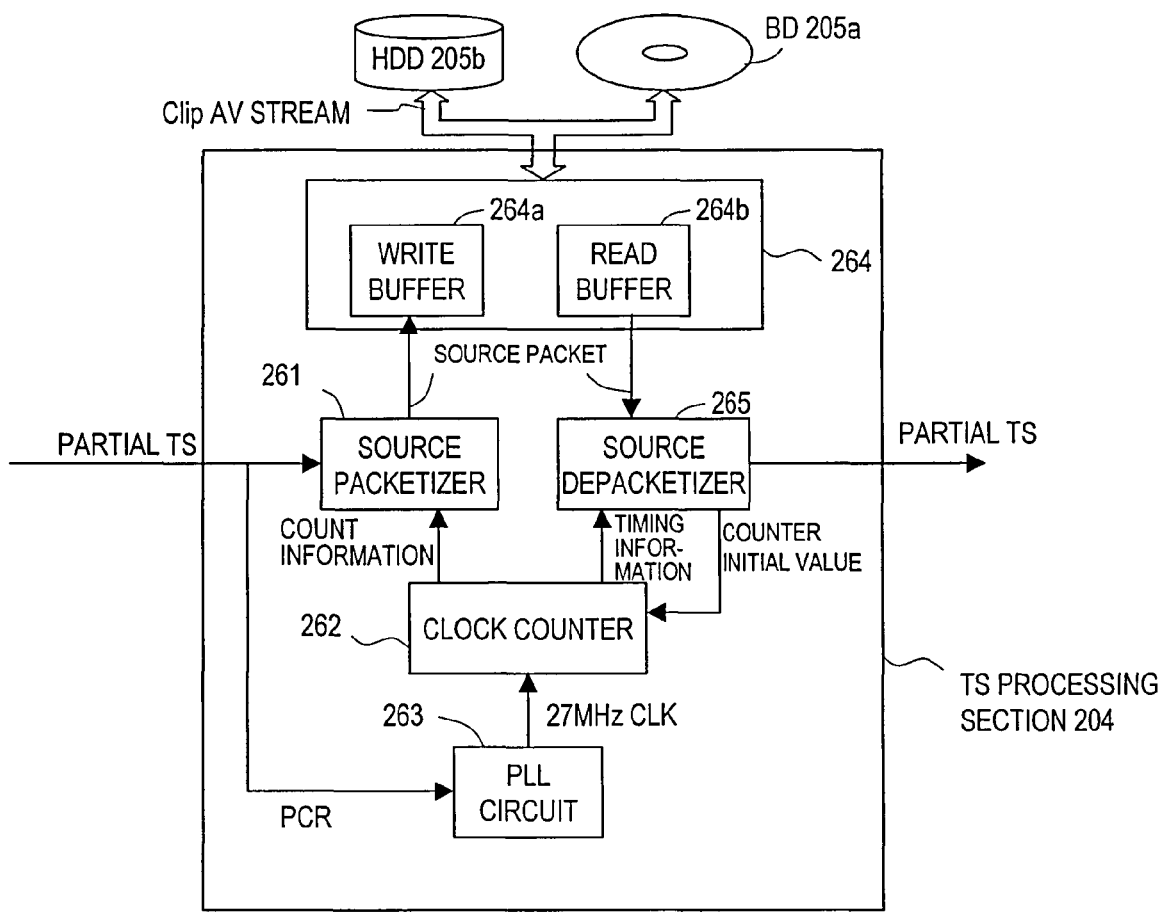

FIG. 6 shows a detailed arrangement of functional blocks in the TS processing section 204.

Figure 7:
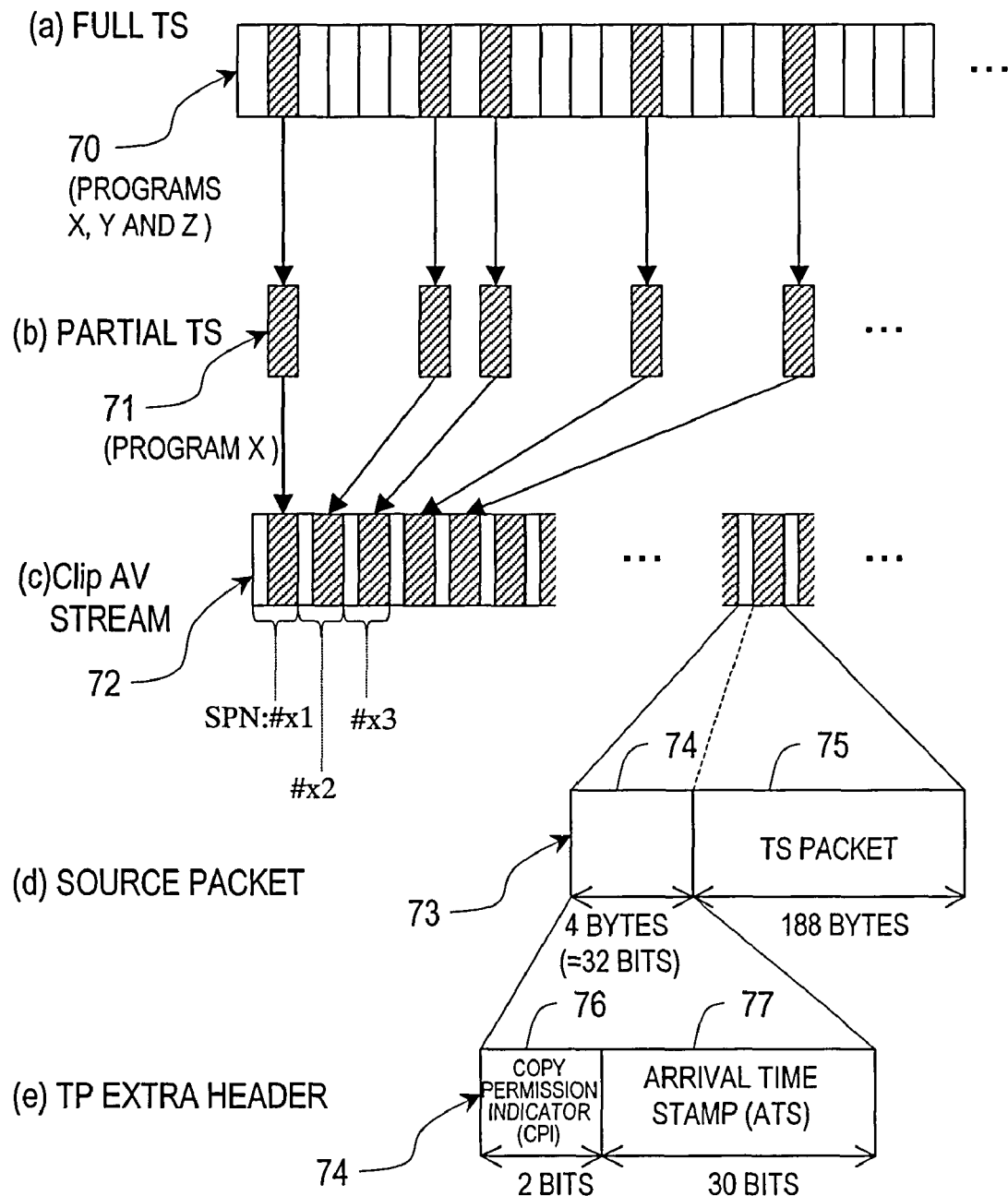

Portions (a) through (e) of FIG. 7 show a correlation between a transport stream and a clip AV stream.

Figure 8:
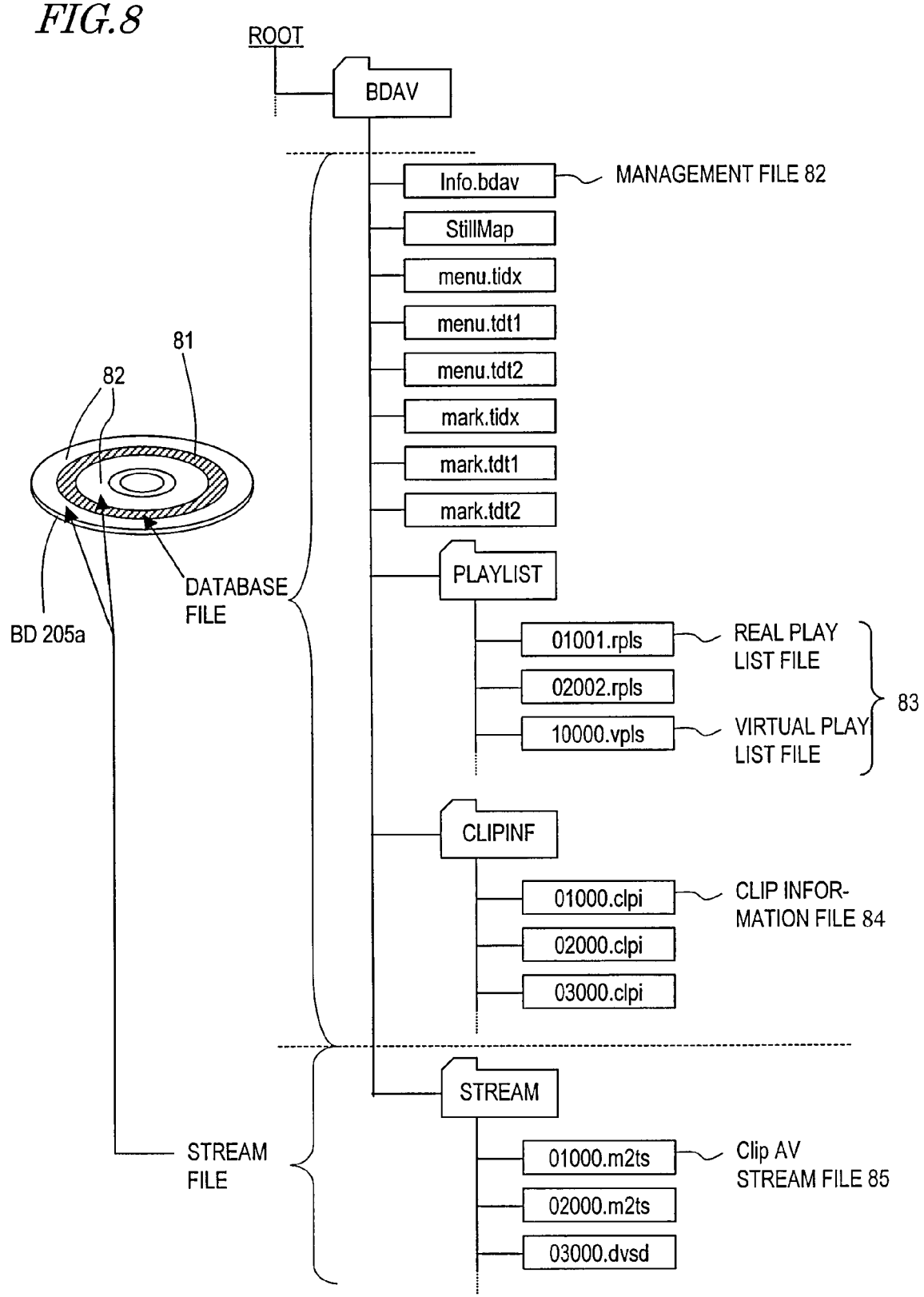

FIG. 8 shows a storage area on the BD 205a and its directory/file structure.

Figure 9:
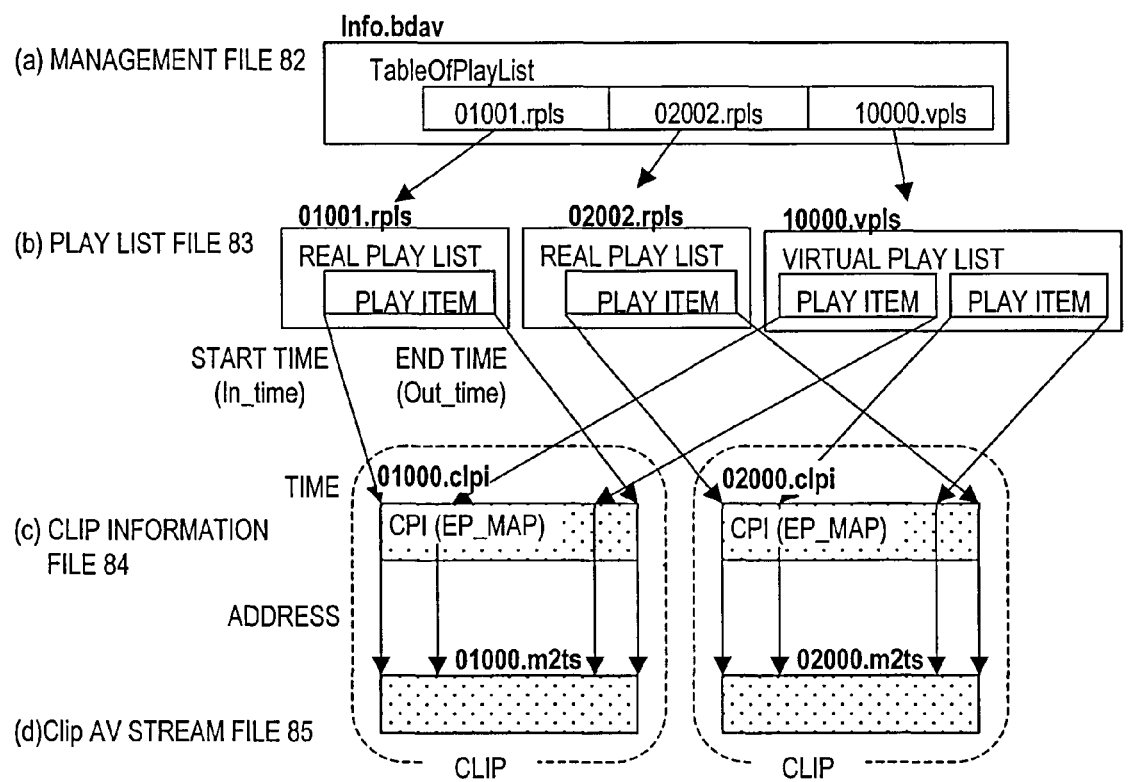

Portions (a) through (d) of FIG. 9 show a relationship between the management information and the stream data.

Figure 10:
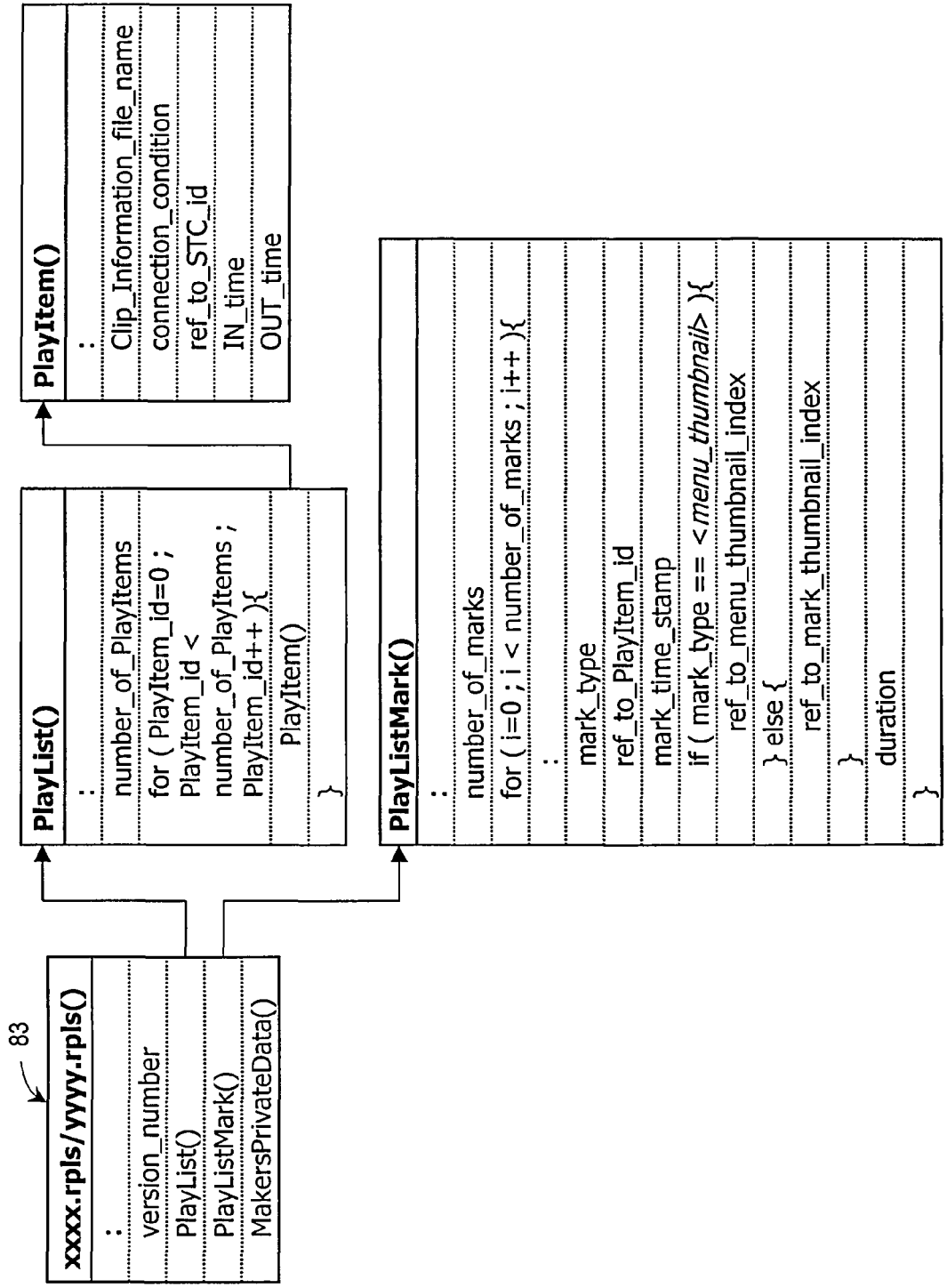

FIG. 10 shows the information (entries) stored in the playlist file 83 and its data structure.

Figure 11:
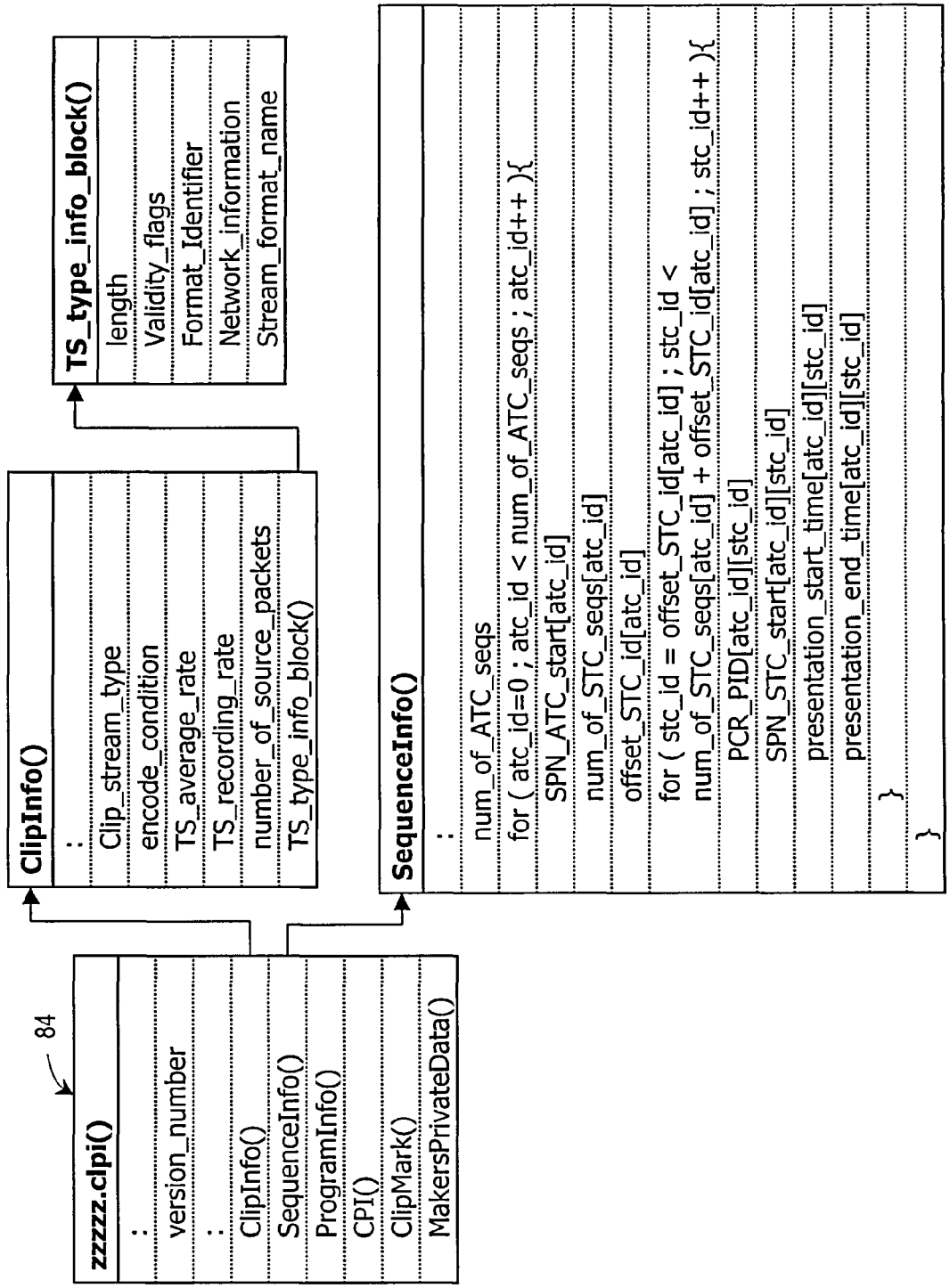

FIG. 11 shows the data structures of the information (entries) stored in the clip information file 84 and some entries in the clip information file.

FIG. 12 shows the data structures of the information (entries) stored in the clip information file 84 and other entries in the clip information file.

Figures 13, 14:
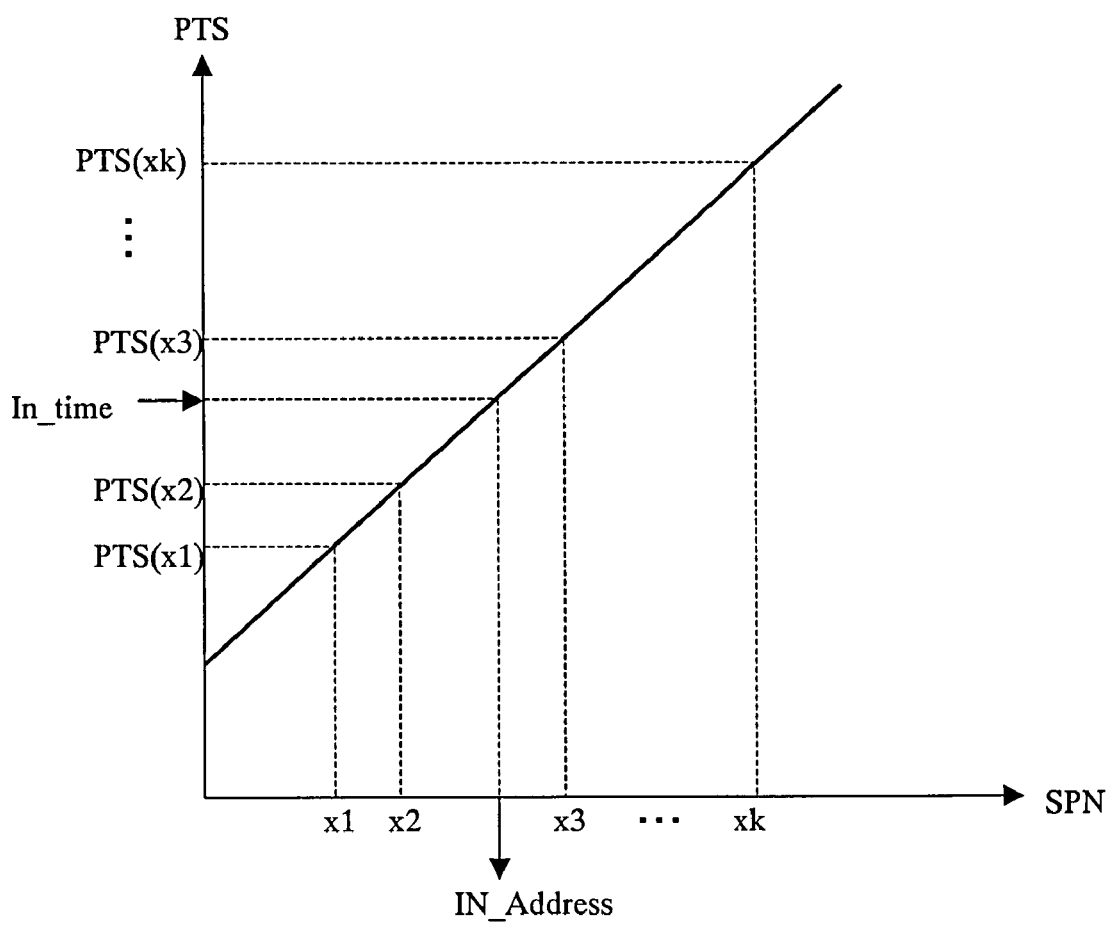

FIG. 13 shows the data structure of a time/address conversion table.

FIG. 14 shows a first exemplary time/address correlation.

Figure 15:
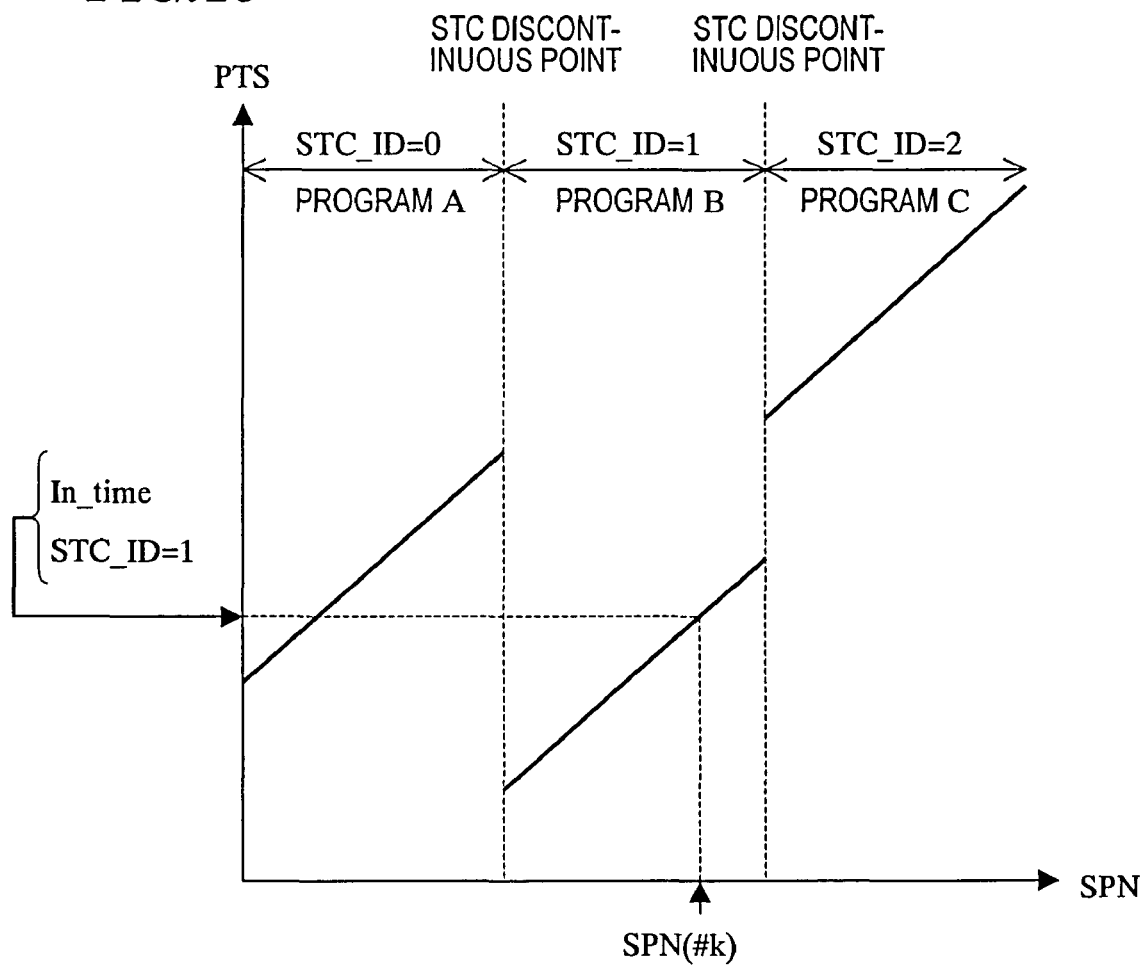

FIG. 15 shows a second exemplary time/address correlation.

Figure 16:
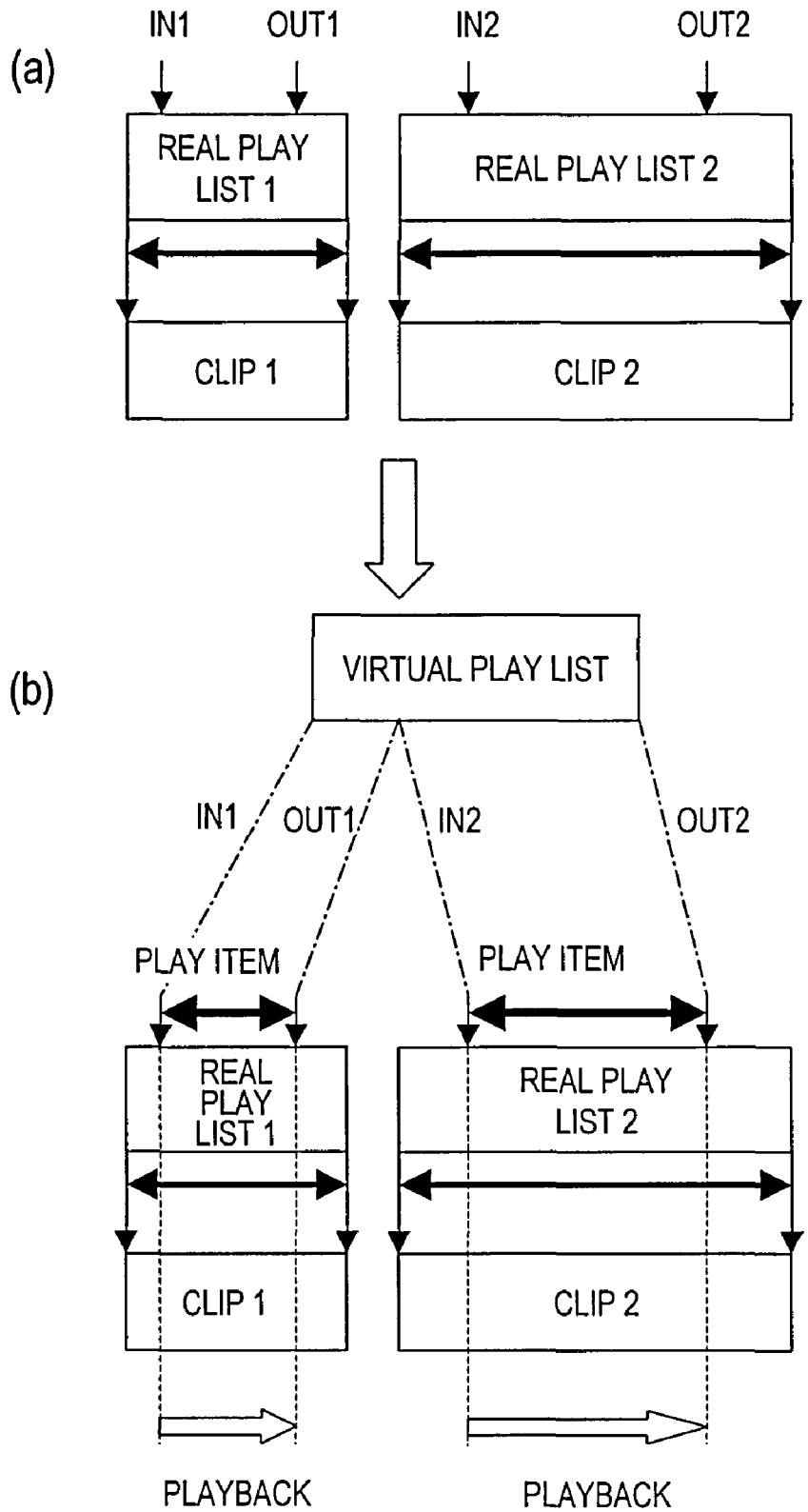

Portion (a) of FIG. 16 shows Real playlists Nos. 1 and 2 with their associated Clips Nos. 1 and 2 and portion (b) of FIG. 16 shows a virtual playlist for playing back a first interval from IN1 through OUT1 and a second interval from IN2 through OUT2 continuously.

Portion (a) of FIG. 17 shows the location of a splitting point for splitting the virtual playlist shown in portion (b) of FIG. 17 and portion (b) of FIG. 17 shows Virtual playlists Nos. 1 and 2 that have been split.

Portion (a) of FIG. 18 shows Virtual playlists Nos. 1 and 2 to be combined together and portion (b) of FIG. 18 shows the combined virtual playlist.

Figure 19:
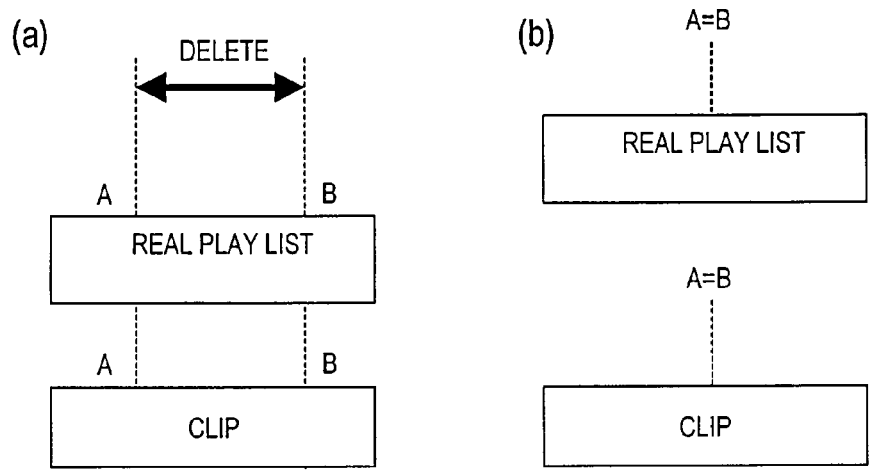

FIG. 19(a) shows a real playlist and a clip, from which an interval A-B should be deleted, while FIG. 19(b) shows a real playlist and a clip, from which the interval A-B has been deleted and in which the points A and B have been combined together.

Figure 20:
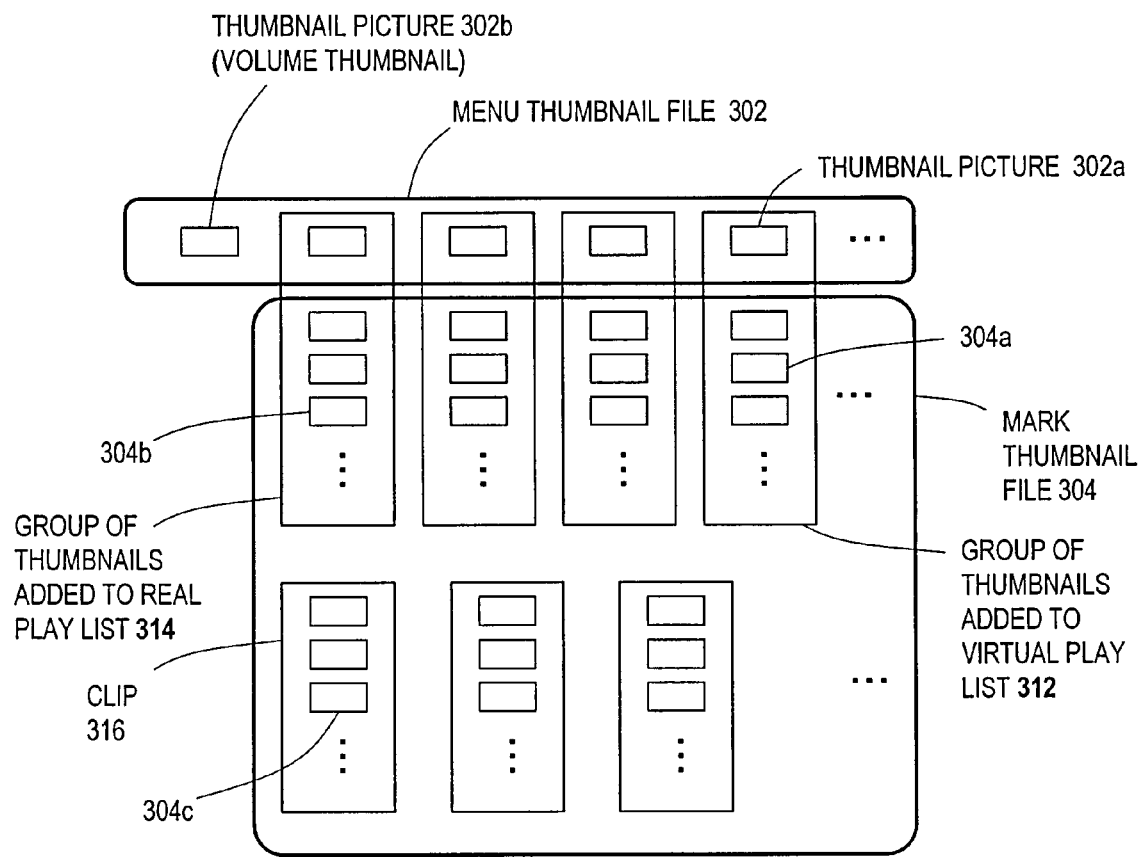

FIG. 20 shows a correlation between thumbnail pictures to be managed on the BD 205a and a management file.

Figure 21:
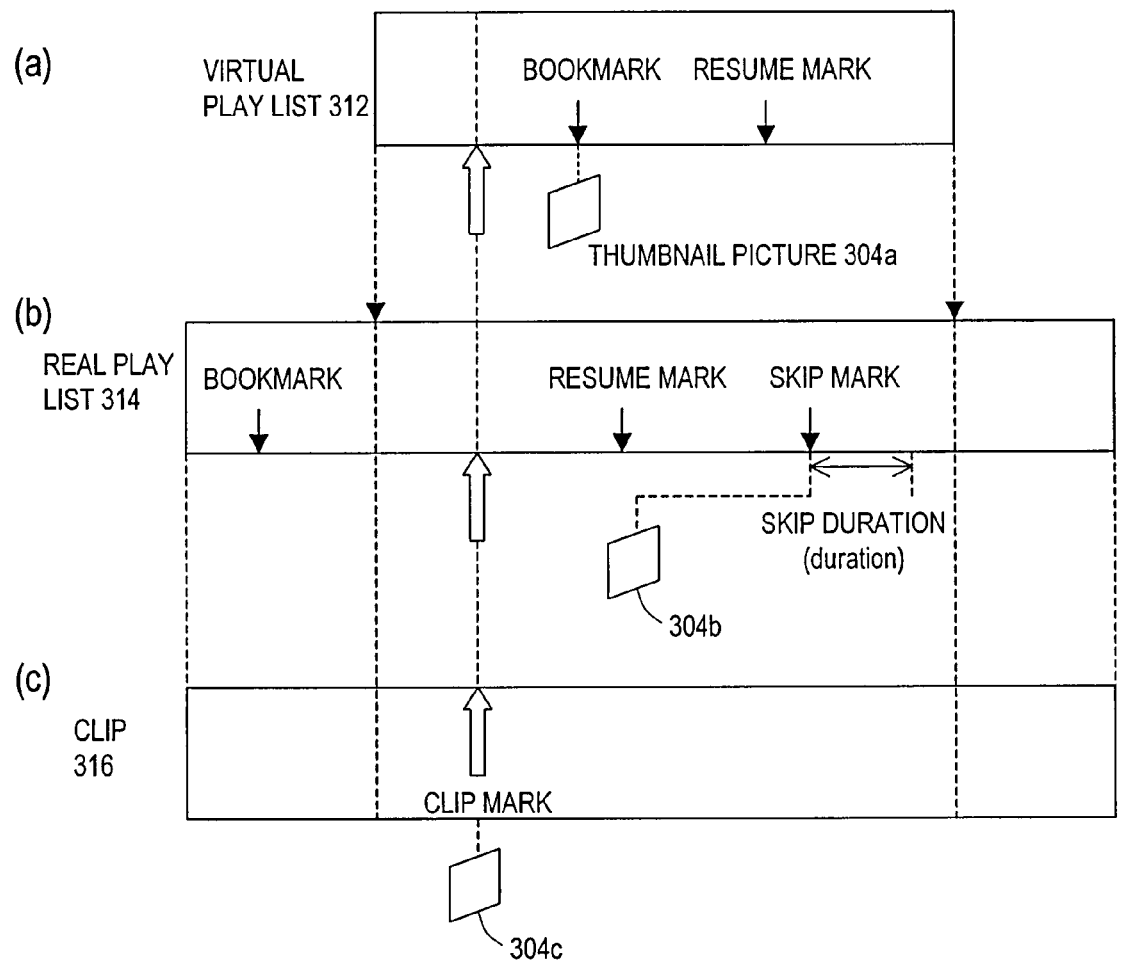

Portions (a) through (c) of FIG. 21 respectively show a virtual playlist 312, a real playlist 314 and a clip 316, to each of which a mark has been added.

Figure 22:
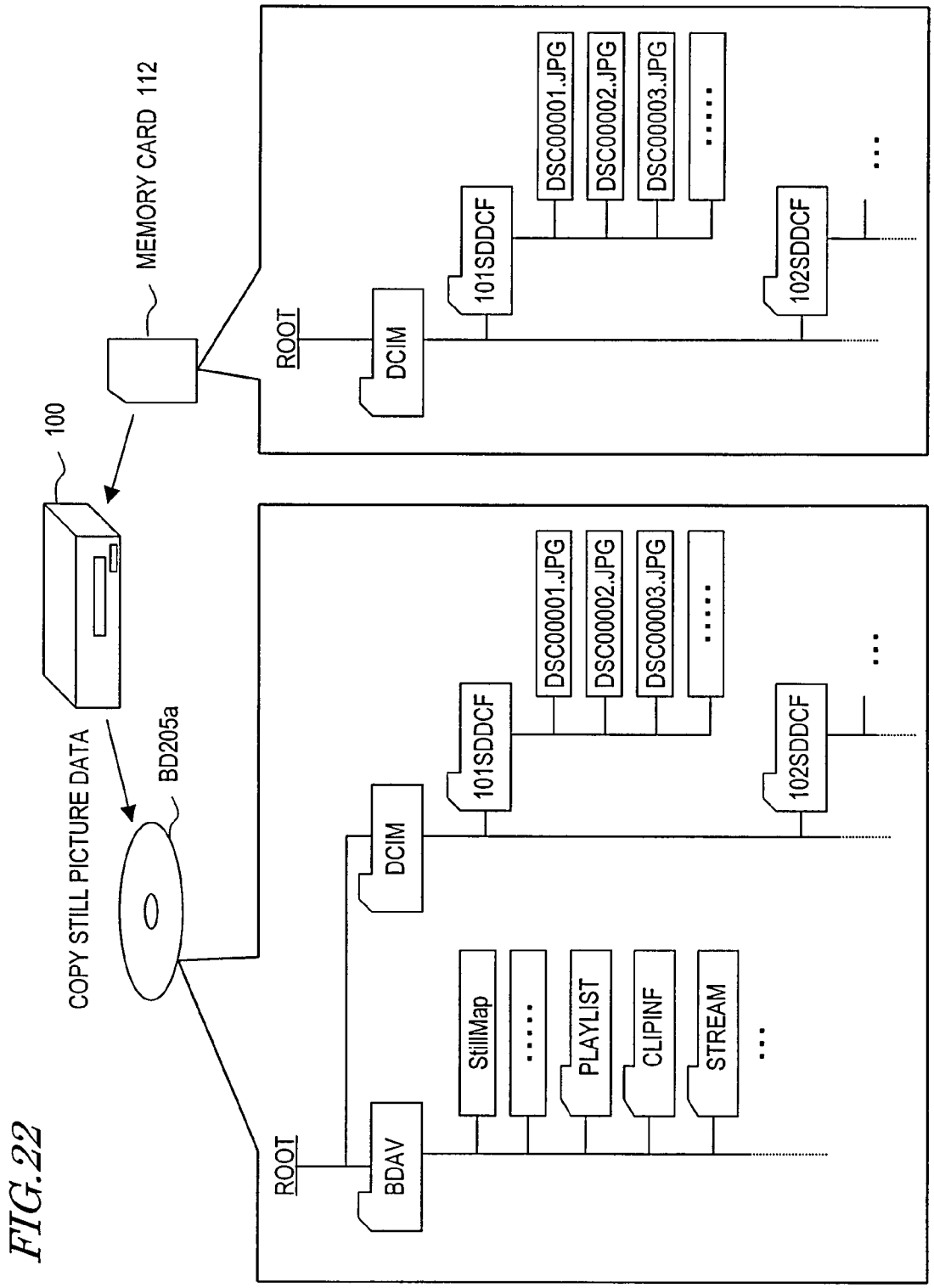

FIG. 22 shows a BD 205a to which the still picture data stored on a memory card 112 has been copied.

Figure 23:
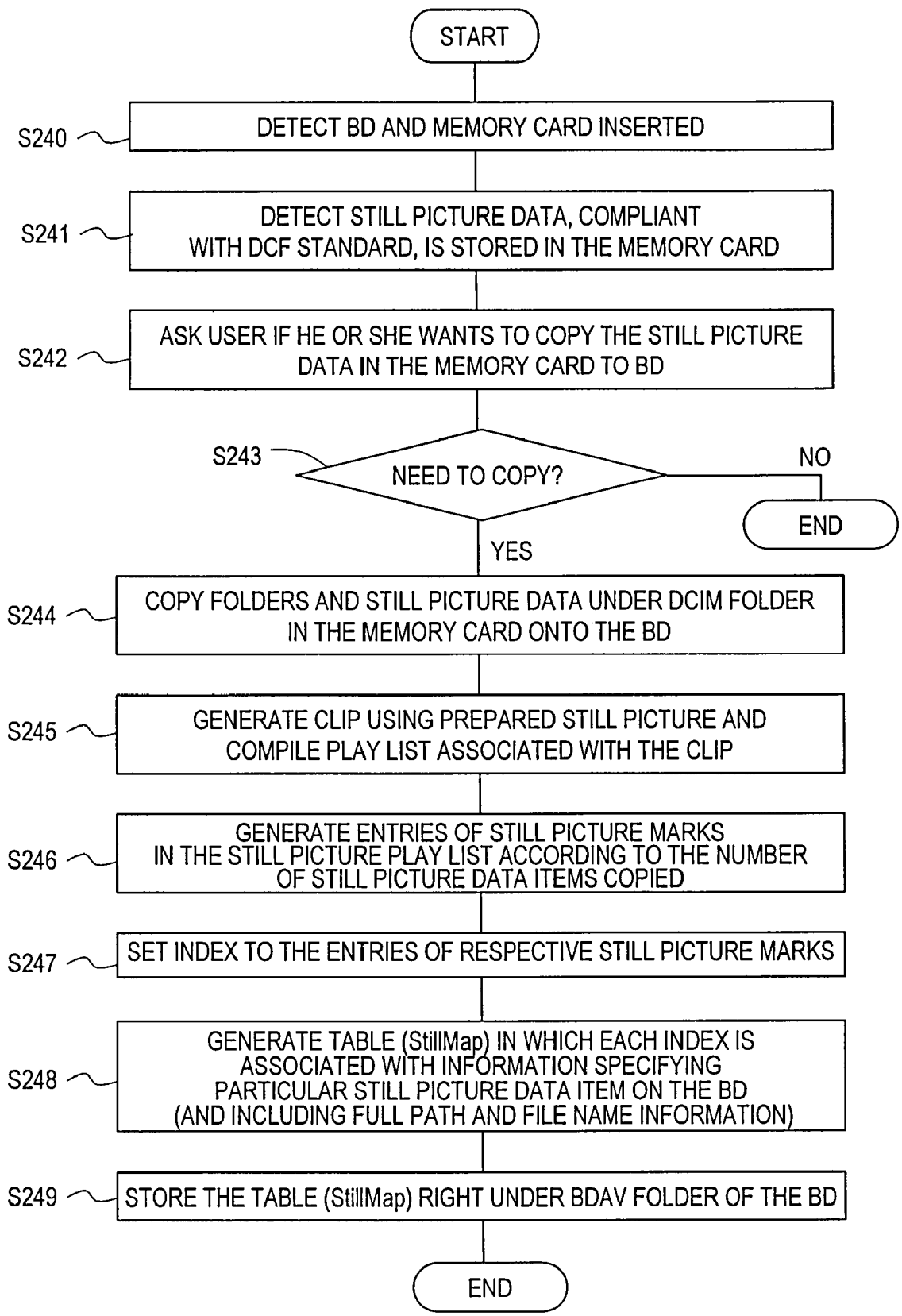

FIG. 23 is a flowchart showing the procedure of copying still picture data according to a preferred embodiment of the present invention.

Figure 24:
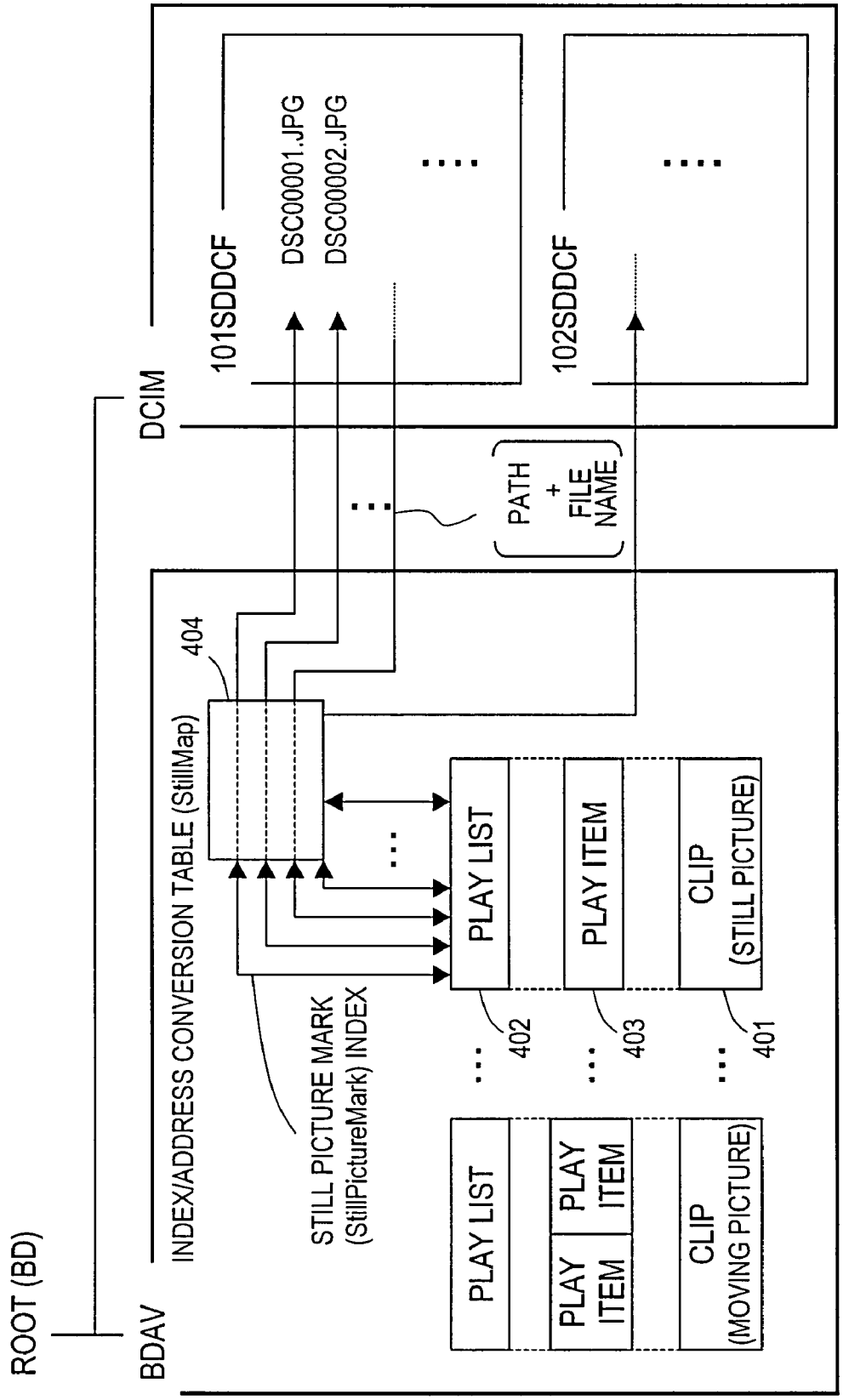

FIG. 24 shows the BD 205a that has been subjected to the copying processing.

FIG. 25(a) shows how a still picture mark may be defined to present still pictures sequentially (as slides) and FIG. 25(b) shows how a still picture mark may be defined to present moving pictures and a still picture in combination.

Figure 26:
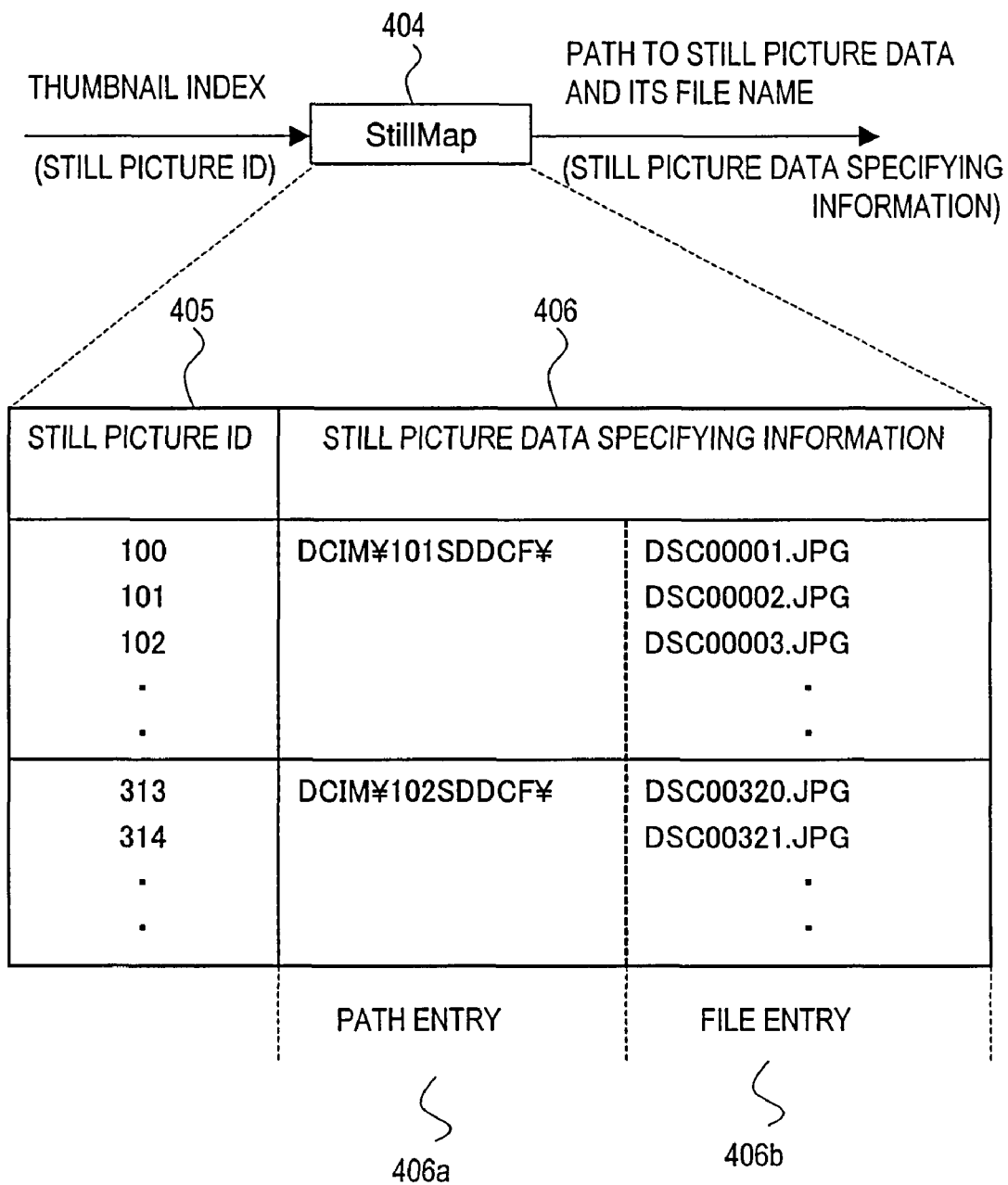

FIG. 26 shows the correspondence of the index/address conversion table (StillMap) 404.

Figure 27:
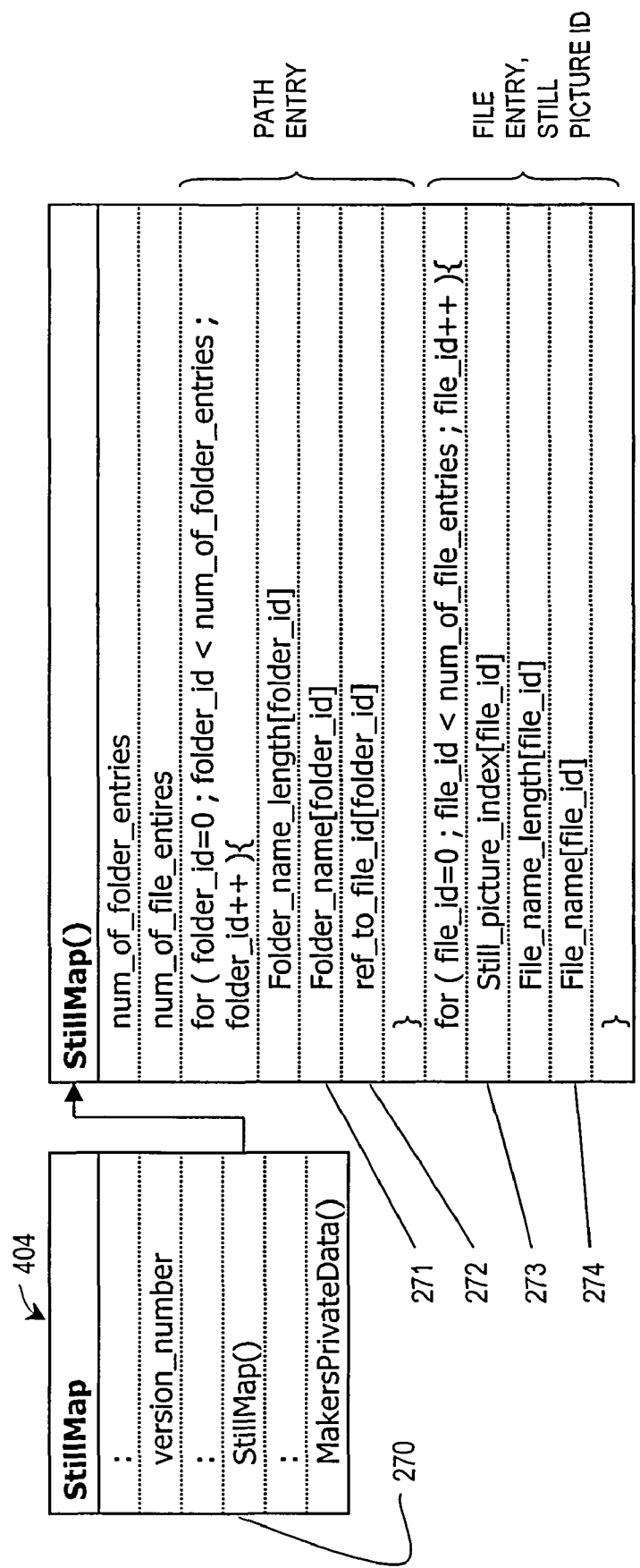

FIG. 27 shows an exemplary data structure of the index/address conversion table (StillMap) 404.

Figure 28:
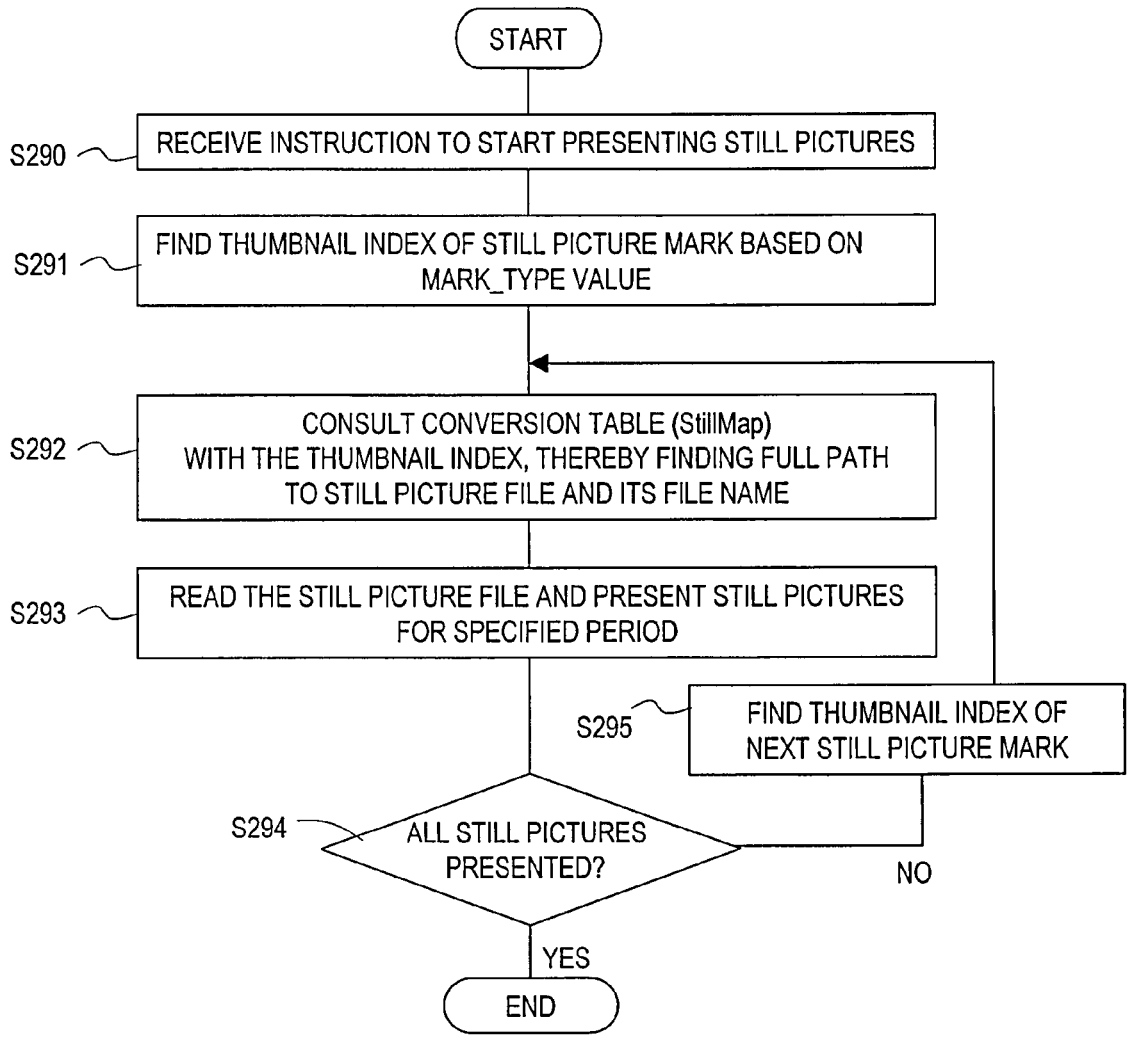

FIG. 28 shows the procedure of performing still picture presentation processing using the conversion table 404.

FIG. 29(a) shows a BD 205a on which moving pictures and still pictures are stored in combination and FIG. 29(b) shows the presentation order of the still pictures and moving pictures that has been set in FIG. 29(a) and also show how the system time clocks STC change.

DESCRIPTION OF REFERENCE NUMERALS

100 BD recorder with built-in HDD
106 TV
108 PC
112 memory card
114 BD
201a digital tuner
201b analog tuner
202 A/D converter
203 MPEG-2 encoder
204 TS processing section
205a BD
205b HDD
206 MPEG-2 decoder
207 graphic control section
208 memory
209 D/A converter
210 program ROM
211 CPU
212 RAM
213 CPU bus 214 network control section
215 instruction receiving section
216 interface (I/F) section
217 memory card control section
250 system control section
261 source packetizer
262 clock counter
263 PLL circuit
264 buffer
265 source depacketizer

BEST MODE FOR CARRYING OUT THE INVENTION

Hereinafter, preferred embodiments of a data processor according to the present invention will be described with reference to the accompanying drawings. In the following description, the data processor is supposed to be an optical disk recorder.

Figure 1:
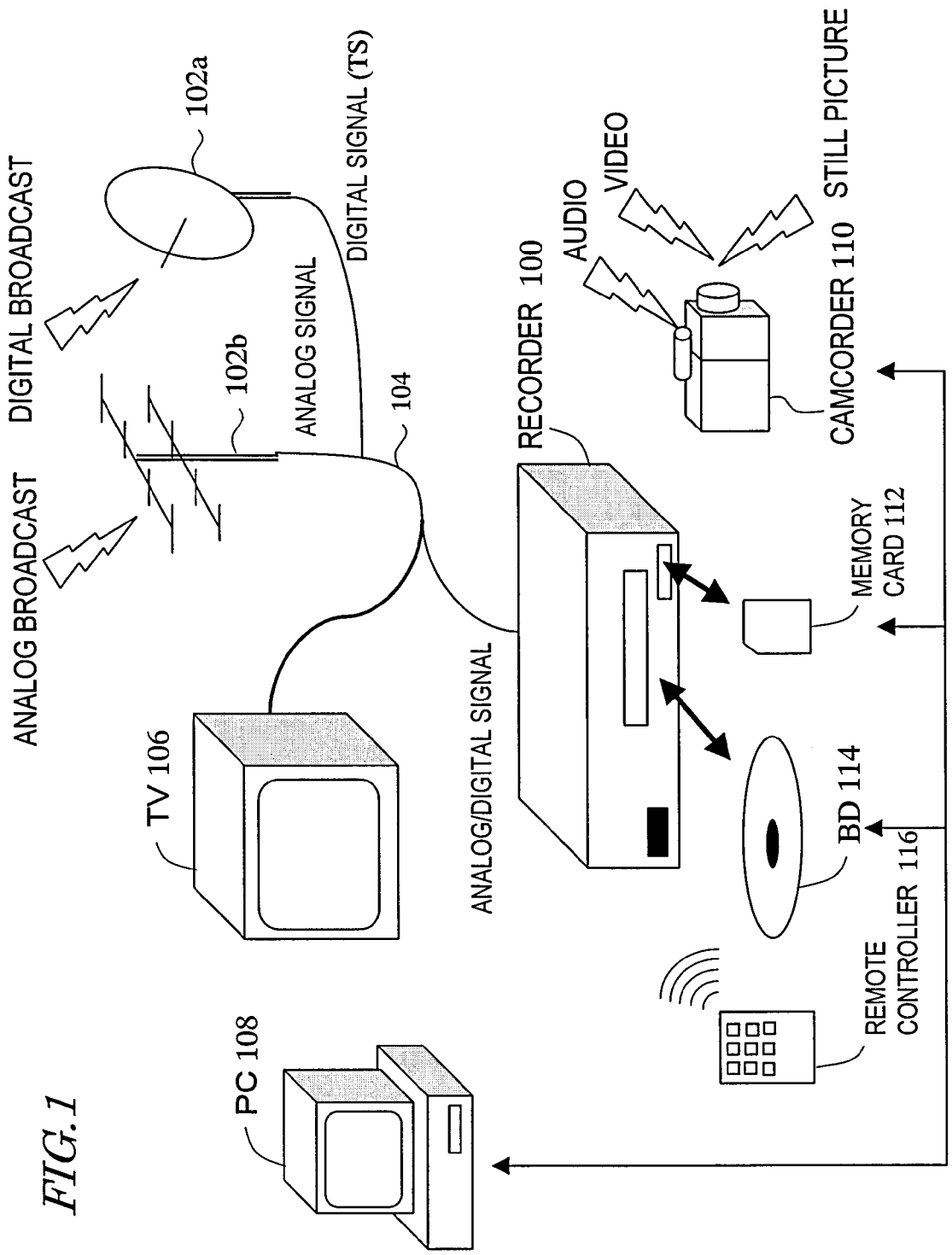
FIG. 1 shows a configuration for a system that is made up of an optical disk recorder 100 according to a preferred embodiment of the present invention and other devices.

FIG. 1 illustrates a configuration for a system that is made up of an optical disk recorder 100 according to a preferred embodiment of the present invention and other devices. The optical disk recorder 100 (which will be simply referred to herein as a "recorder 100") has a recording function, i.e., can record a moving picture data stream representing the video and audio of a broadcast program on a Blu-ray Disc (BD) 114. The recorder 100 also has a playback function, i.e., can read the data stream that has been recorded on the BD 114 and play back the moving picture. FIG. 1 shows other devices that can operate in conjunction with the recorder 100 to execute its recording and playback functions. The recorder 100 performs its recording and playback functions in response to an instruction that has been given by user through an input device such as a remote controller 116 or buttons (not shown) on the front side of the recorder 100. It should be noted that data is read from, and written on, a BD using a blue semiconductor laser. The hierarchy structure of a BD and a configuration for an apparatus with the functions of performing recording and playback on/from a BD will be described herein. However, this is just an example. Thus, any other storage medium such as an HD-DVD may also be used instead of a BD.

First, the processing to be done by the recorder 100 to execute its recording function will be described. The recorder 100 is connected to an antenna 102a that receives a digital signal representing a digital broadcast program and to an antenna 102b that receives an analog signal representing an analog broadcast program, and receives a digital signal and an analog signal. The recorder 100 may receive the digital signal and the analog signal through a coaxial cable 104, for example.

The digital signal has been transmitted as an MPEG-2 transport stream (which will be simply referred to herein as a "transport stream" or a "TS"). On receiving the TS, the recorder 100 performs predetermined processing on the TS and then records it on the BD 114 while maintaining its TS packet structure to be described later. On receiving an analog signal, the recorder 100 extracts moving picture data from the analog signal and compresses and encodes the data, thereby generating a TS and recording the TS on the BD 114. The recorder 100 can also record a broadcast program on a memory card 112 such as an SD memory card or a memory Stick™ and can also copy the still picture data, stored on the memory card 112, to the BD 114. The data structure of the BD 114 for managing still picture as well as moving pictures and the processing associated with the data structure will be described later.

Next, the processing to be done by the recorder 100 to execute its playback function will be described. The recorder 100 decodes the audio and video that has been recorded on the BD 114 and reproduces the data on a TV 106 and through loudspeakers (not shown). The video and audio do not have to be those of a broadcast program but may also have been captured using a camcorder, for example. The BD 114 on which video and audio have been recorded may be removed from the recorder 100, loaded into another device such as a PC 108 and then played by that device.

Hereinafter, the data structure of a transport stream to be transmitted as a digital broadcast signal will be described with reference to FIGS. 2 to 4.

Figure 2:
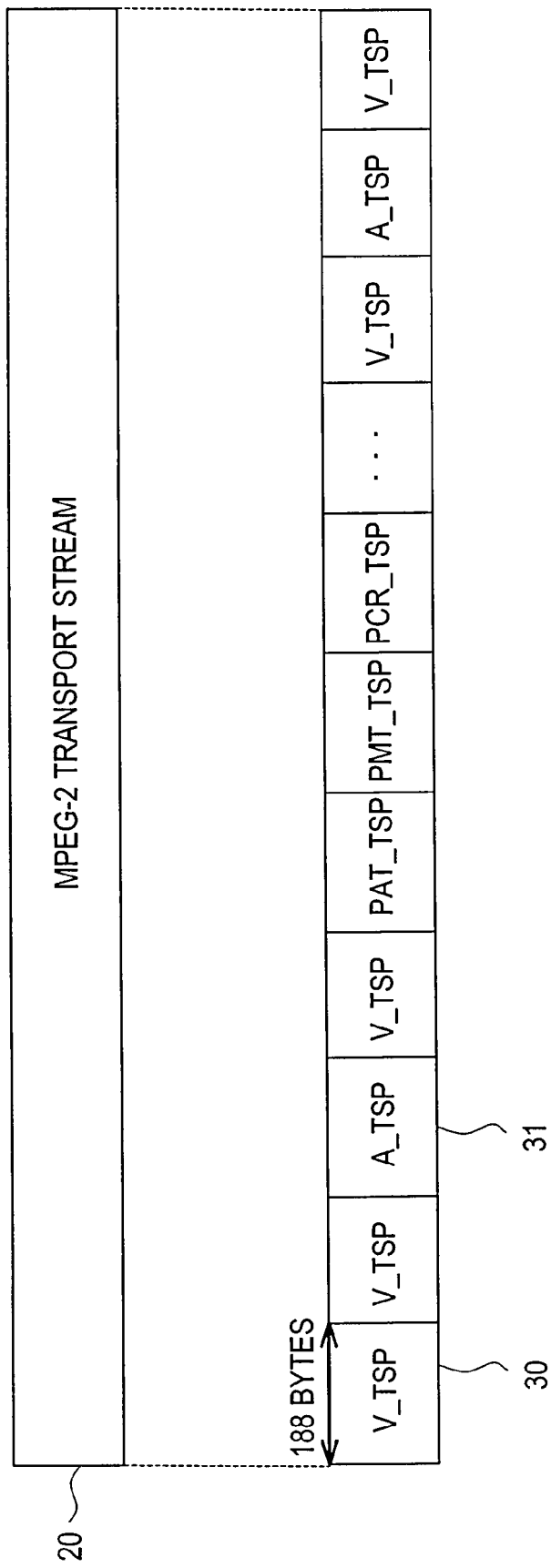
FIG. 2 shows the data structure of a transport stream (TS) 20.

FIG. 2 shows the data structure of a transport stream (TS) 20. Examples of TS packets include a video TS packet (V_TSP) 30 in which compressed video data is stored, an audio TS packet (A_TSP) 31 in which compressed audio data is stored, a packet (PAT_TSP) in which a program association table (PAT) is stored, a packet (PMT_TSP) in which a program map table (PMT) is stored, and a packet (PCR_TSP) in which a program clock reference (PCR) is stored. Each of these TS packets has a data size of 188 bytes. The TS packets describing the program formation, including PAT_TSP and PMT_TSP, are generally called "PSI/SI packets".

Hereinafter, the video TS packets and audio TS packets relating to the processing of the present invention will be described. FIG. 3(a) shows the data structure of a video TS packet 30. The video TS packet 30 includes a transport packet header 30a of 4 bytes and a transport packet payload 30b of 184 bytes. Video data 30b is stored in the payload 30b. On the other hand, FIG. 3(b) shows the data structure of an audio TS packet 31. The audio TS packet 31 also includes a transport packet header 31a of 4 bytes and a transport packet payload 31b of 184 bytes. Audio data 31b is stored in the transport packet payload 31b.

As can be seen from this example, a TS packet usually consists of a transport packet header of 4 bytes and elementary data of 184 bytes. In the packet header, a packet identifier (PID) showing the type of that packet is described. For example, the PID of a video TS packet is 0x0020, while that of an audio TS packet is 0x0021. The elementary data may be content data such as video data or audio data or control data for controlling playback. The type of data stored there changes according to the type of the packet.

Hereinafter, a correlation between video data and pictures that make up the video will be described as an example. Portions (a) to (d) of FIG. 4 show the makeup of a stream when video pictures are played back from video TS packets. As shown in portion (a) of FIG. 4, this TS 40 includes video TS packets 40a through 40d. Although the TS 40 may include other packets, only those video TS packets are shown here. A video TS packet can be easily identifiable by the PID stored in its header 40a-1.

A packetized elementary stream is made up of the video data of respective video TS packets such as the video data 40a-2. Portion (b) of FIG. 4 shows the data structure of a packetized elementary stream (PES) 41. The PES 41 includes a plurality of PES packets 41a, 41b, etc. The PES packet 41a is made up of a PES header 41a-1 and a PES payload 41a-2. These data are stored as the video data of the video TS packets.

Each PES payload 41a-2 includes the data of a single picture. An elementary stream is made up of those PES payloads 41a-2. Portion (c) of FIG. 4 shows the data structure of an elementary stream (ES) 42. The ES 42 includes multiple pairs of picture headers and picture data. It should be noted that the "picture" is generally used as a term that may refer to either a frame or a field.

In the picture header 42a shown in portion (c) of FIG. 4, a picture coding type, showing the picture type of the following picture data 42b, is described. In the same way, a picture coding type, showing the picture type of the following picture data 42d, is described in the picture header 42c. The "type" is one of an I-picture (intra-coded picture), a P-picture (predictive-coded picture) and a B-picture (bidirectionally-predictive-coded picture). If the type shows this is an I-picture, its picture coding type may be "001b", for example.

The picture data 42b, 42d, etc. is data corresponding to a single frame, which may consist of either that data only or that data and preceding/succeeding data to be decoded before and/or after the former data. For example, portion (d) of FIG. 4 shows a picture 43a consisting of the picture data 42b and a picture 43b consisting of the picture data 42d.

In playing back video based on a TS, the recorder 100 gets video TS packets, extracts picture data through the processing described above, and gets pictures that form the video. As a result, the video can be presented on the TV 106.

Next, the configuration of the recorder 100 of this preferred embodiment will be described with reference to FIG. 5, which shows an arrangement of functional blocks in the recorder 100. The recorder 100 includes not only the BD 205a but also a hard disk 205b as storage media. That is to say, the recorder 100 is a BD recorder with the built-in HDD 205b.

The recorder 100 includes a digital tuner 201a, an analog tuner 201b, an A/D converter 202, an MPEG-2 encoder 203, a TS processing section 204, an MPEG-2 decoder 206, a graphic control section 207, a memory 208, a D/A converter 209, a CPU bus 213, a network control section 214, an instruction receiving section 215, an interface (I/F) section 216, a memory card control section 217 and a system control section 250. In FIG. 5, the optical disk 205a is shown within the recorder 100. However, the optical disk 205a is removable from the optical disk recorder 100 and is not an integral part of the recorder 100 itself.

Hereinafter, the functions of these components will be described one by one. The digital tuner 201a receives a digital signal from the antenna 102a (see FIG. 1) including at least one program. The transport stream to be transmitted as the digital signal includes packets representing a plurality of programs. Such a transport stream including packets representing a plurality of programs will be referred to herein as a "full TS". The digital tuner 201a tunes itself to a particular channel, extracts only packets representing a requested program, and then outputs it as a "partial TS".

The packets on a desired channel may be extracted from the full TS in the following manner. Suppose the program number (or channel number) of the designated program is X. In that case, first, the full TS is searched for the program association table packet (i.e., PAT_TSP shown in FIG. 2). The packet ID (PID) of the program association table packet is always zero. Thus, a packet having that value may be searched for. In the program association table in the program association table packet, respective program numbers and the program map table packet PIDs (i.e., PMT_TSP shown in FIG. 2) of respective programs associated with those program numbers are stored. Thus, the packet ID (PID) of the program map table (PMT) associated with the program number X can be detected. The PID of the program map table PMT is supposed to be XX.

Next, when the program map table packet (i.e., PMT_TSP shown in FIG. 2) with PID=XX is extracted, a program map table PMT associated with the program number X can be obtained. The program map table PMT includes the PIDs of TS packets, in which the video and audio information of each program to watch and listen to is stored on a program-by-program basis. For example, the PID of the video information associated with the program number X may be XV and the PID of the audio information thereof may be XA. By using the PID (=XV) of the packet storing the video information and the PID (=XA) of the packet storing the audio information that have been obtained in this manner, the video and audio packets about a particular program can be extracted from a full TS.

In making a partial TS from a full TS, not only those packets that store the required video and audio information but also program specific information (PSI) packets and service information (SI) packets need to be extracted and corrected. As used herein, the PSI packets collectively refer to the program association table packets (PAT_TSP) and program map table packets (PMT_TSP) shown in FIG. 2. The PSI packets need to be corrected because the full TS and the partial TS include different numbers of programs, and therefore, the program association table and the program map table need to be adapted to the partial TS. The SI packet includes data describing the contents, schedule/timings and so on of the programs included in the full TS and separately defined expansion information (which is also called "program service information"). In the full TS, the SI packet includes as many as 20 to 30 different types of data. Among these types of data, only important data for playing back the partial TS is extracted to generate a single SIT packet and multiplex it in the partial TS. Also, in the partial TS, information indicating that the stream is a partial TS (which is called a "partial transport stream descriptor") is stored in the SIT packets. It is already a conventional technique to multiplex an SIT packet in a partial TS so as to comply with the European and Japanese digital broadcasting standards (DVB/ARIB).

The analog tuner 201b receives an analog signal from the antenna 102b (see FIG. 1), tunes itself to a particular channel according to the frequency, extracts the signal of a requested program, and then outputs the video and audio signals of the program to the A/D converter 202. In FIG. 1, the recorder 100 receives the digital signal and analog signal through a coaxial cable 104. Therefore, strictly speaking, there is only one signal input system in the example illustrated in FIG. 5. However, since the digital signal and the analog signal can be easily separated from each other according to their frequencies, the digital signal and the analog signal are shown in FIG. 5 as being input through two different systems.

The A/D converter 202 converts the input signals into digital ones and supplies them to the MPEG-2 encoder 203. On receiving an instruction to start recording, the MPEG-2 encoder 203 (which will be simply referred to herein as an "encoder 203") compresses and encodes the supplied digital data of the analog broadcast into the MPEG-2 format, generates a transport stream and passes it to the TS processing section 204. This processing is continued until the encoder 203 receives an instruction to end the recording. To perform the compression coding, the encoder 203 includes a buffer (not shown) for temporarily storing reference pictures and so on.

In recording moving pictures, the TS processing section 204 receives the partial TS, generates a clip AV stream from it, and records the stream on the BD 205a and/or the HDD 205b. The clip AV stream is a data stream, of which the format is suitable for recording it on the BD 205a and/or the HDD 205b. The clip AV stream is made up of a plurality of source packets, which are generated by adding a predetermined header to the respective TS packets that form the partial TS.

The processing of generating the clip AV stream will be described more fully later with reference to FIGS. 7(a) through 7(e).

In playing back moving pictures, the TS processing section 204 reads the clip AV stream from the BD 205a and/or the HDD 205b, generates a partial TS from the clip AV stream, and outputs it to the MPEG-2 decoder 206.

Also, the TS processing section 204 may receive still picture data that is stored in a memory card 112 from a memory card control section 217 to be described later and write the still picture data as it is on the BD 205a and/or the HDD 205b without processing it. Or the TS processing section 204 may also read the still picture data that has been written on the BD 205a and/or the HDD 205b and output it to the decoder 206. A more detailed configuration and operation of the TS processing section 204 will be described more fully later with reference to FIGS. 6 and 7. In this description, the TS processing section 204 is supposed to write data on the BD 205a and/or the HDD 205b and read data from at least one of them just for illustrative purposes. Actually, however, the stream is written on, or read from, the BD 205a or HDD 205b by controllers (not shown) provided for the respective drives as the disk rotates and as the head moves.

The MPEG-2 decoder 206 (which will be simply referred to herein as a "decoder 206") analyzes the partial TS supplied to get MPEG-2 compression-encoded data. Then, the decoder 206 expands the compression-encoded data, converts it into decompressed data and then passes it to the graphic control section 207. The decoder 206 can convert not only the MPEG-2 compression encoded data but also still picture data compliant with the JPEG standard into decompressed data. The graphic control section 207 is connected to the internal computer memory 208 and realizes an on-screen display (OSD) function. For example, the graphic control section 207 combines any of various menu pictures with the video and outputs the resultant synthetic image to the D/A converter 209. In response, the D/A converter 209 converts the input OSD synthetic image and audio data into analog data and outputs them to the TV 106, for example.

The CPU bus 213 is a path for transferring signals in the recorder 100 and is connected to the respective functional blocks as shown in FIG. 5. In addition, the respective components of the system control section 250 to be described later are also connected to the CPU bus 213.

The network control section 214 is an interface for connecting the recorder 100 to the network 101 such as the Internet and is a terminal and a controller that are compliant with the Ethernet™ standard, for example. The network control section 214 exchanges data over the network 101. The data may be timetable data about broadcast programs and updated data of a software program for controlling the operation of the recorder 100.

The instruction receiving section 215 is a photodetector section for receiving an infrared ray from the operating button arranged on the body of the recorder 100 or from a remote controller. The instruction receiving section 215 receives a user's instruction to start or stop a recording operation or to start or stop playing back a recorded program. Furthermore, the instruction receiving section 215 receives a user's instruction to copy a still picture from the memory card 112 loaded to the BD 205a and/or the HDD 205b.

The interface (I/F) section 216 controls the connector for use to allow the recorder 100 to communicate with other devices and also controls the communications themselves. The I/F section 216 includes a terminal compliant with the USB 2.0 standard, a terminal compliant with the IEEE 1394 standard, and a controller for enabling data communications according to any of these various standards and can exchange data according to a method that complies with any of these standards. For example, the recorder 100 may be connected to the PC 108 or a camcorder (not shown) by way of the USB 2.0 terminal and to a digital high-definition TV tuner or the camcorder (not shown) by way of the IEEE 1394 terminal, respectively.

The memory card control section 217 includes a slot for loading the memory card 112 into the recorder 100 and a controller for controlling data communications between the recorder 100 and the memory card 112. The memory card control section 217 reads out a still picture data file, a moving picture data file or any other file from the memory card 112 loaded and transmits it over the CPU bus 213.

The system control section 250 controls the overall processing of the recorder 100 including the signal flows there and includes a program ROM 210, a CPU 211 and a RAM 212, all of which are connected to the CPU bus 213. A software program for controlling the recorder 100 is stored in the program ROM 210.

The CPU 211 is a central processing unit for controlling the overall operation of the recorder 100. By reading and executing a program, the CPU 211 generates a control signal to realize the processing defined by the program and outputs the control signal to the respective components over the CPU bus 213. The memory 212 has a work area for storing data that is needed for the CPU 211 to execute the program. For example, the CPU 211 reads out a program from the program ROM 210 and outputs it to the random access memory (RAM) 212 through the CPU bus 213 and executes the program. The computer program may be circulated on the market by being stored on a storage medium such as a CD-ROM or downloaded over telecommunications lines such as the Internet. As a result, a computer system that is set up using a PC and so on can also operate as a data processor having functions that are equivalent to those of the recorder 100 of this preferred embodiment.

FIG. 6 shows the detailed arrangement of functional blocks in the TS processing section 204. The TS processing section 204 includes a source packetizer 261, a clock counter 262, a PLL circuit 263, a buffer 264, and a source depacketizer 265.

The source packetizer 261 receives a partial TS and adds a predetermined header to the top of a TS packet included in the partial TS, thereby generating and outputting a source packet. The header includes an arrival time stamp (ATS) showing the time when the TS packet was received (i.e., the arrival time of that TS packet). The arrival time of the TS packet is known by reference to a count value (count information) from a reference time that has been given to the source packetizer 261. The reason why the information about the arrival time of the TS packet is included will be described later with reference to FIG. 7.

The clock counter 262 and the PLL circuit 263 generate information that is needed for the source packetizer 261 to find the arrival time of the TS packet. First, the PLL circuit 263 extracts a PCR packet (i.e., PCR_TSP shown in FIG. 2) from the partial TS and gets a program clock reference (PCR) representing a reference time. The same value as the PCR value is set as the system time clock (STC) of the recorder 100, which is used as a reference time. The system clock of the system time clock STC has a frequency of 27 MHz. The PLL circuit 263 outputs the 27 MHz clock signal to the clock counter 262, which receives the clock signal and outputs it as count information to the source packetizer 261.

The buffer 264 includes a write buffer 264a and a read buffer 264b. The write buffer 264a sequentially stores the source packets received and outputs them to the BD 205a, for example, such that the packets are written there when the overall data size reaches a predetermined value (e.g., the full capacity of the buffer). The series of source packets to be output at this time (i.e., a data stream) will be referred to herein as a "clip AV stream". On the other hand, the read buffer 264b temporarily buffers the clip AV stream that has been read out from the BD 205a, for example, and outputs it on a source packet basis.

The source depacketizer 265 receives the source packets, converts them into TS packets, and then outputs them as a partial TS. It should be noted that the source depacketizer 265 outputs the TS packets at time intervals corresponding to the original arrival time in accordance with the timing information provided by the clock counter 262 and the TS packet arrival time stamp ATS included in the source packet. As a result, the TS processing section 204 can output the TS packets at the same timing as the arrival of the TS packets during the recording operation. To find the reference time of the partial TS that has been read, the source depacketizer 265 sends the arrival time, which is specified in the first source packet, for example, as an initial value to the clock counter 262. As a result, the clock counter 262 can start counting at that initial value and the result of the subsequent counting can be received as timing information.

Hereinafter, it will be described with reference to FIG. 7 exactly what type of processing is carried out by the TS processing section 204. Portions (a) through (e) of FIG. 7 show a correlation between a transport stream and a clip AV stream. For the purpose of reference, portion (a) of FIG. 7 shows a full TS 70, in which TS packets, including the data of three programs X, Y and Z, may be arranged in series, for example. Portion (b) of FIG. 7 shows a partial TS 71 that has been generated by the digital tuner 201a from the full TS 70. The partial TS 71 is a stream formed by extracting some packets from the continuous full TS. Thus, in the partial TS 71, those packets are dispersed discretely on the time axis. However, the intervals between those packets have been adjusted by the sender of the full TS so as to satisfy the conditions to make the decoder decode appropriately. Those "conditions" are laid down by the MPEG standard such that the buffer memory of a TS system target decoder (T-STD), defined as an ideal model of an MPEG-2 TS, does not cause an overflow or underflow.

The partial TS 71 may include the TS packets about the program X, for example.

Portion (c) of FIG. 7 shows a clip AV stream 72, in which source packets are arranged continuously. Those source packets are identified by source packet numbers (SPN) #1, 2, 3 and so on.

Portion (d) of FIG. 7 shows the data structure of a source packet 73, which has a fixed data length of 192 bytes. More specifically, each source packet 73 is formed by adding a TP extra header 74 of 4 bytes to the top of a TS packet 75 of 188 bytes. The source packetizer 261 generates the source packet by adding the TP extra header 74 to the top of a TS packet in the partial TS.

Portion (e) of FIG. 7 shows the data structure of the TP extra header 74. The TP extra header 74 is made up of a copy permission indicator (CPI) 76 of 2 bits and an arrival time stamp (ATS) 77 of 30 bits. The copy permission indicator (CPI) 76 indicates, by its bit value, how many times (i.e., zero times (copy prohibited), only once or an unlimited number of times) part or all of the clip AV stream 72 may be copied. The arrival time stamp (ATS) 77 describes the time at a precision of 90 kHz.

It should be noted that the clip AV stream 72 shown in portion (c) of FIG. 7 is written on the BD 205a using a set of 32 source packets (6 KB) as a unit. Such a unit is called an "aligned unit". The aligned unit is defined because the BD 205a uses sectors each having a size of 2 KB and can align the sectors on the basis of 32 source packets.

Next, it will be described with reference to FIG. 8 how the clip AV stream is recorded on the BD 205a. Since the clip AV stream may be recorded on the HDD 205b, the same data structure may be used. However, as the HDD 205b is not usually removed from the recorder 100 and installed in another device, the data may be written there using a unique data structure as well.

FIG. 8 shows a storage area on the BD 205a and its directory/file structure. The BD 205a includes a gathered file area 81 and a real-time data area 82. The gathered file area 81 has a storage capacity of several hundreds of megabytes. In the gathered file area 81, stored are management information files (or database files) for managing the playback of the clip AV stream. As shown in FIG. 8, there are multiple types of database files including a management file (Info.bdav) 82, playlist files (01001.rpls and 10000.vpls) 83 and a clip information file (01000.clpi) 84. These database files are accessed rather frequently. That is why the gathered file area 81 is located at the center of the storage area of the BD 205a that can be accessed efficiently. Also, the database files are indispensable for playing back a moving picture stream such as the clip AV stream. Thus, an error contained there, if any, would cause a serious trouble. For that reason, the database files are backed up on the same BD 205a.

On the other hand, the real-time data area 82 has a storage capacity of 23 to 27 gigabytes. In the real-time data area 82, stored is a stream file representing the clip AV stream (e.g., a clip AV stream file (01000.m2ts) 85). Unlike the database files described above, a read error of a stream file, if any, would have only a local effect. But the stream file needs to be read continuously. That is why write processing is carried out so as to guarantee continuous reading rather than reducing the errors. Specifically, the clip AV stream file 85 is written on a continuous area (i.e., a continuous logic sector) with a minimum size of 12 megabytes. This minimum size of data to be written is called an "extent". It should be noted that a DV stream could also be written on the real-time data area 82. In the following description, however, the clip AV stream is supposed to be written there.

Next, the correlation among the management file 82, the playlist file 83, the clip information file 84 and clip AV stream file 85 will be described with reference to portions (a) through (d) of FIG. 9, which shows a relationship between the management information and the stream data. The management information is shown in portions (a) through (c) of FIG. 9, while the stream data is shown in portion (d) of FIG. 9. Portion (a) of FIG. 9 shows a table of playlists described in the management file (Info.bdav) 82. That is to say, a table of playlist file names that signify the playlists on the BD 205a is stored in the management file 82. As used herein, the "playlist" refers to a piece of information that defines a playback path for a part or all of more than one clip AV stream.

Portion (b) of FIG. 9 shows playlists that are described in the playlist file 83 and that have extensions rpls and vpls. The playlists are classifiable into real playlists and virtual playlists. A real playlist may be generated by the recorder 100 when stream data is written for the first time, for example, and its playback path is specified as from the beginning through the end of moving pictures. Meanwhile, a virtual playlist is specified by the user with respect to the stream data written, and therefore, the user can specify any locations and ranges he or she likes.

Each range of a playlist is defined by respective play items in the playlist. Specifically, the play items describe a start time (In_time) corresponding to the presentation start time and an end time (Out_time) corresponding to the presentation end time. The start and end times are described as presentation time stamps (PTS) specifying the presentation time of a video frame played back and the output time of an audio frame reproduced. Just after a recording operation has been finished, a real playlist usually defines only one play item to specify the start and end times of moving pictures. Meanwhile, a virtual playlist may define any number of play items. Multiple play items may be provided for a single virtual playlist and may be described so as to specify mutually different moving picture streams.

Portion (c) of FIG. 9 shows a time/address conversion table (EP_map) 84 that is described in clip information files 84 with an extension clpi. The conversion table (EP_map) 84 shows a correspondence between the presentation time of a clip AV stream and an address at which the data to be presented at that time is stored. By reference to this conversion table 84, the address in the clip AV stream, at which the data to be presented at that time is stored, can be detected based on the start time (In_time) and end time (Out_time) specified by the play item. The principle of conversion using this conversion table 84 will be described more fully later with reference to FIGS. 13 through 15.

Portion (d) of FIG. 9 shows a moving picture stream that is stored in clip AV stream files 85 with an extension m2ts. In this portion (d) of FIG. 9, the files "01000.m2ts" and "02000.m2ts" are clip AV stream files.

As shown in portions (c) and (d) of FIG. 9, a single clip information file is provided for each single clip AV stream file on the BD 205a. Such a combination of a clip AV stream file and a clip information file will be referred to herein as a "clip".

FIG. 10 shows information (entries) stored in the playlist file 83 and its data structure. In a file 83 with an extension "rpls" or an extension "vpls", there is an entry shown as PlayList( ), which corresponds to the playlist described above. Play items (PlayItems) #1, 2, and so on are described as low-level entries of the playlist information (PlayList). In each of these play items, stored are the file name of a clip information file to be played back (Clip_Information_file_name), an identifier for identifying an STC (ref_to_STC_id), a start time (In_time), an end time (Out_time) and so on. The playlist file 83 may also include an entry shown as a "PlayListMark", the function of which will be described later.

FIGS. 11 and 12 show the information (entries) stored in the clip information file 84 and the data structures of the entries of the clip information file. The clip information file 84 includes various entries. Among those entries, the detailed data structures of the clip-related information (ClipInfo) and sequence information (SequenceInfo) are shown in FIG. 11. The clip-related information (ClipInfo) also includes a number of entries. FIG. 11 shows the detailed data structure of one entry (TS_type_info_block) included in the clip-related information. Also, as can be seen from FIG. 12, the time/address conversion table (EP_map) is provided as an entry in the characteristic point information (CPI). Other entries (ClipMark and so on) will be described later. The conversion table (EP_map) is provided for every program recorded, i.e., for the PID of every video TS packet recorded.

As shown in FIG. 12, TU_map may be provided instead of the EP_map. TU_map is a table showing the correspondence between the arrival time stamps (ATS) of the packets and the source packet numbers. The packet arrival time entries may be provided at an interval of one second, for example. And the number of the source packet generated from the TS packet that has been received for the first time immediately after that time is associated with that time.

Next, the data structure of a time/address conversion table (EP_map) and the principle of a time/address conversion to be done using the conversion table 84 will be described with reference to FIGS. 13 through 15. FIG. 13 shows the data structure of a time/address conversion table. On this conversion table, a time stamp PTS representing a time is associated with a source packet number SPN representing an address. As far as video is concerned, this time stamp PTS is that of each I-picture arranged at the top of a GOP compliant with an MPEG standard. Also, the source packet number SPN is the number of a source packet in which the top data of an I-picture played back at the time corresponding to the PTS is stored. Each source packet has a data size of 192 bytes. Therefore, if the source packet number is known, the number of bytes as counted from the top of a clip AV stream can be figured out and that data can be accessed easily and just as intended. On this conversion table, the actual values of the source packet numbers X1, X2, and so on are not always consecutive integers but may also be integers with an increment of two or more.

FIG. 14 shows a first exemplary time/address correlation. As described above, only the PTS value of each I-picture arranged at the top of a GOP is described on the time/address conversion table. That is why if another PTS value, different from the PTS value, is specified as either the start time (In_time) and/or the end time (Out_time), then the address (or source packet number) associated with that time cannot be obtained directly. According to the MPEG-2 Video compression coding method, however, compression processing is carried out using the difference between pictures. Therefore, unless the I-picture at the top of a GOP is decoded first, the pictures that follow cannot be decoded, either. That is why as long as the entry of an I-picture is described, no problem should occur in actual playback. And the playback of further picture units may be controlled by starting decoding from the I-picture specified on the time/address conversion table (EP_map) and subjecting only expected pictures to presentation processing while analyzing and decoding the pictures that follow.

FIG. 15 shows a second exemplary time/address correlation. The difference from the example shown in FIG. 14 will be pointed out. The target of recording does not have to be a single broadcast program but may also be a number of continuous programs. In that case, although the PTS and source packet number may be defined uniquely for each program, those values may sometimes overlap with each other between multiple programs. That is why even in that case, the time/conversion needs to be carried out just as intended using the time/address conversion table (EP_map). Thus, a piece of information STC_ID to identify a particular presentation point is defined and used, along with the time information, to find the source packet number.

First, the first recorded program is given STC_ID=0. As already described with reference to FIG. 6, each partial TS is processed by reference to its own system time clock STC. Thus, the system time clocks STC are discontinuous at the switching point of programs. FIG. 15 shows an example in which when Programs A, B and C are recorded, there are STC discontinuous points between Programs A and B and between Programs B and C. Different STC_IDs are set for respective timings. In FIG. 15, the first program A is given STC_ID=0, the next program B is given STC_ID=1, and the last program is given STC_ID=2. Besides, by defining the longest playback duration of a single STC_ID stream, it is guaranteed that the same PTS never exists even within the same STC_ID. Since the MPEG PTS has a length of 33 bits at a precision of 90 kHz, the PTS cannot be represented properly for no more than about 26.5 hours.

By assigning STC_ID as described above, the proper source packet number can be obtained just as originally specified by reference to the time information (In_time and Out_time) and STC_ID. It can be seen that PlayItem( ) shown in FIG. 10 includes not only information about the start time (IN_time) and end time (OUT_time) but also an entry (ref_to_STC_id) to specify STC_ID.

Next, it will be described with reference to FIGS. 16 through 19 how to edit a clip AV stream using a virtual playlist. Portion (a) of FIG. 16 shows Real playlists Nos. 1 and 2 with their associated Clips Nos. 1 and 2. Suppose a virtual playlist for playing back respective portions of Clips Nos. 1 and 2 continuously should be made. Portion (b) of FIG. 16 shows a virtual playlist for playing back a first interval from IN1 through OUT1 and a second interval from IN2 through OUT2 continuously. The first and second intervals are specified by mutually different play items in the virtual playlist. The virtual playlist can apparently combine respective playback intervals of two different clips with each other without directly processing Real playlists Nos. 1 and 2 and Clips Nos. 1 and 2.

However, since the MPEG-2 Video compression coding method requires that compression be done based on the difference between pictures as described above, the picture cannot be usually decoded, and no video can be presented for a while, just after the picture has been retrieved at IN2. This is because the data of its preceding picture has not been gotten yet.

To realize seamless playback of video only, the video needs to be re-encoded at connection points by making destructive editing on the original stream. In that case, the connection information (connection_condition) of the play item is set to "4". However, the destructive editing leaves no original video. Thus, a clip called "bridge clip" may be newly provided by assembling streams around a connection point together and re-encoding them to realize seamless connection without editing the original stream as in the destructive editing. During the playback, the playback controls are switched to the bridge clip just before the connection point and the second interval is played back after the bridge clip has been played back. As a result, the scenes can be changed seamlessly and smoothly. It should be noted that the connection information using this bridge clip is set to "3".

Portion (a) of FIG. 17 shows the location of a splitting point for splitting the virtual playlist shown in portion (b) of FIG. 16. Portion (b) of FIG. 17 shows Virtual playlists Nos. 1 and 2 that have been split. Virtual Playlist No. 1 defines continuous playback of the entire interval of Real playlist No. 1 and a partial interval of Real Playlist No. 2. On the other hand, Virtual Playlist No. 2 defines the playback of the remaining interval of Real Playlist No. 2.

Alternatively, a type of processing opposite to that of the processing shown in portions (a) and (b) of FIG. 17, i.e., combining a plurality of virtual playlists together, may also be carried out. Portion (a) of FIG. 18 shows Virtual Playlists Nos. 1 and 2 to be combined together. Portion (b) of FIG. 18 shows the combined virtual playlist.

In both the example shown in portions (a) and (b) of FIG. 17 and the example shown in portions (a) and (b) of FIG. 18, by using the virtual playlist, the clips can be apparently slit or combined without directly processing Real Playlists Nos. 1 and 2 or Clips Nos. 1 and 2.

On the other hand, in partially deleting a real playlist, a clip and the real playlist need to be processed directly. FIG. 19(a) shows a real playlist and a clip, from which the interval A-B should be deleted, while FIG. 19(b) shows a real playlist and a clip, from which the interval A-B has been deleted and in which the points A and B have been combined together. The reason why the clip and the real playlist are directly processed only when the real playlist is deleted either partially or fully is that only the real playlist has direct causality with the video and audio data. That is to say, at the user interface on the recorder, only the real playlist (which has the same significance as the clip for the user) and the virtual playlist (mere playback path information) are supposed to be presented to the user without making him or her sense the clip.

Next, it will be described with reference to FIG. 20 how to manage thumbnail pictures. FIG. 20 shows a correlation between thumbnail pictures to be managed on the BD 205a and a management file. The thumbnail picture is a reduced size picture representing a scene of moving pictures or a still picture and is provided to make the contents of the moving pictures and still pictures easily recognizable.

The thumbnail picture related data is stored in a plurality of files. In FIG. 20, shown are a menu thumbnail file 302 and a mark thumbnail file 304 for managing thumbnail pictures. The menu thumbnail file 302 stores index information about the thumbnails of the BD 205a or the playlist. This index information includes the management numbers (menu_thumbnail_index) of thumbnail pictures 302a, 302b, etc. to be managed on the menu thumbnail file 302. The thumbnail picture 302a shows the typical content of the virtual playlist 312. The thumbnail picture 302b is called a "volume thumbnail" and shows the typical content of the overall BD AV directory. In FIG. 8, a "menu.tidx" file corresponding to the menu thumbnail file 302 and "menu.tdt (n)" (where n=1, 2, . . . ) representing the substantive data of the respective thumbnail pictures are shown.

On the other hand, the mark thumbnail file 304 stores index information about "mark" thumbnails that are added to a desired video location and that function as a bookmark. This index information also includes the management numbers (mark_thumbnail_index) of thumbnail pictures 304a, 304b, 304c, etc. to be managed on the mark thumbnail file 304. The thumbnail picture 304a is a reduced size picture showing a location in the virtual playlist 312 to which a mark has been added. The thumbnail picture 304b is a reduced size picture showing a location in the real playlist 314 to which a mark has been added. And the thumbnail picture 304c is a reduced size picture showing a location in the clip 316 to which a clip mark has been added. In FIG. 8, a "mark.tidx" file corresponding to the mark thumbnail file 304 and "mark.tdt (n)" (where n=1, 2, . . . ) representing the substantive data of the respective thumbnail pictures are shown. The data of these thumbnail pictures has been compressed and encoded compliant with the JPEG standard.

By using the menu thumbnail file 302 and the mark thumbnail file 304 described above, all thumbnail pictures may be presented as a list or only the thumbnail pictures of particular marks may be presented selectively. As a result, the user can easily check out the outline of the moving pictures being managed on the BD 205a, that of various playlist s or that of a plurality of scenes of a particular playlist.

Portions (a) through (c) of FIG. 21 respectively show a virtual playlist 312, a real playlist 314 and a clip 316, to each of which a mark has been added. On the BD 205a, the user can put several types of marks. Examples of those marks include a "bookmark" specifying the playback start point of a desired moving picture (content), a "skip mark" specifying the point (or interval) not to play back but to skip, a "resume mark" specifying the location where viewing was stopped last time, and a "chapter mark" specifying the top of a chapter.

A bookmark and a resume mark have been added to the virtual playlist 312 shown in portion (a) of FIG. 21. These marks are described on the "PlayListMark" entry of a playlist file (with an extension vpls). In FIG. 10, PlayListMark( ) corresponding to the PlayListMark entry is shown. In PlayListMark( ), "mark_type" is a piece of information showing the type of a mark such as a bookmark or a resume mark. On the other hand, "mark_time_stamp" is a piece of information specifying the time stamp (PTS) of a picture to which the mark has been added. Each mark may be associated with a thumbnail picture. The thumbnail picture 304a shown in portion (a) of FIG. 21 is a reduced size picture of a scene for which the bookmark has been set. The thumbnail picture 304a provided for the virtual playlist 312 is managed on the mark thumbnail file 304.

Next, a bookmark, a resume mark and a skip mark have been added to the real playlist 314 shown in portion (b) of FIG. 21. As for the skip mark, a thumbnail picture 304b can also be provided for the skip start point, and the duration of skip may also be defined.

A clip mark has been added to the clip 316 shown in portion (c) of FIG. 21. The clip mark is added by the recorder 100 when a clip AV stream is generated. The user can do nothing about the generation of the clip mark or the deletion of the clip mark generated. The clip mark is directly added to the clip, and therefore, can function effectively even while playback is carried out based on the playlists 312 and 314. A thumbnail picture 304c may also be provided for the clip mark.

The ID of the maker (maker_ID) of the recorder (such as the recorder 100) and its own information (makers_private_data) may be added to each of those marks. Thus, the functions of the apparatus can be expanded by each individual maker using those marks.

As described above, still picture data such as the thumbnail pictures can be handled by using the marks. Thus, a data structure that makes it possible to process still picture data, which has nothing to do with the contents of the playlist, by further expanding those marks and such a type of processing will be described next.

FIG. 22 shows a BD 205a to which the still picture data stored on a memory card 112 has been copied. The still picture data copied is data about still pictures that were shot by the user using either a digital still camera or the still picture capturing function of a camcorder. A BDAV folder is supposed to have been created in advance on the BD 205a.

On the memory card 112, a file system compliant with the DCF standard, which is adopted by a lot of digital still cameras recently, has been constructed. This file system defines the names and hierarchy structure of folders and so on. More specifically, according to the DCF standard, a directory (folder) named "DCIM" is created right under the root. Under the DCIM folder, folders are created under the names "100XXXXX" through "999XXXXX", where XXXXX are five upper-case alphanumeric letters (in half size). In each of those folders, still picture data are saved in a file format complying with the Exif standard and under the file names "YYYY0001" through "YYYY9999", where YYYY are four upper-case alphanumeric letters (in half size). As long as the data was written compliant with the DCF standard, the storage location of any still picture data and the data itself can be found irrespective of the type of the storage medium or the manufacturer of the player. As a result, still pictures can be reproduced, too.

When loaded with the memory card 112, the recorder 100 copies the folders and still picture data, which are included under the DCIM folder thereof, to right under the root folder of the BD 205a. This copying is done in order to store the still picture data on the BD 205a on the directory/file structures compliant with the DCF standard, too. As a result, even if the BD 205a is removed from the recorder 100 and then loaded into another device (e.g., a PC in which application software compliant with the DCF standard has been installed), the user of the PC can also reproduce the still picture data by using the software and complying with the directory/file structure of the DCF standard. Also, in rewriting the still picture data onto an SD memory card, for example, the user just needs to copy the folders under the DCIM folder directly, which is very easy.

According to this preferred embodiment, the copied still picture data is further associated as marks and presented as a part of the menu described above along with the thumbnails of moving pictures. As to this association, a file storing an index/address conversion table (StillMap) is provided right under the BDAV folder. Hereinafter, it will be described with reference to FIGS. 5 and 23 how the recorder 100 operates to manage still picture data on a BD.

FIG. 23 shows the procedure of copying still picture data according to this preferred embodiment. First, in Step S240, the CPU 211 of the recorder 100 detects that the memory card control section 217 and the BD drive have been loaded with a memory card and a BD, respectively. Next, in Step S241, the CPU 211 accesses the memory card 112 by way of the memory card control section 217 to detect that still picture data is stored in the memory card 112 in a format compliant with the DCF standard. Thereafter, in Step S242, the CPU 211 makes a query to the user whether or not he or she wants to copy the still picture data in the memory card 112 onto a BD. For example, the CPU 211 may instruct the graphic control section 207 to post a message "Do you want to copy still picture data in memory card to a Blu-ray disc?" on the TV 106. When the instruction receiving section 215 receives the user's instruction to start copying in response to the query, the process advances to Step S244. On the other hand, if an instruction not to start copying is received, the process ends.

In Step S244, the CPU 211 copies the folder(s) and still picture data in the DCIM folder in the memory card 112 onto the BD 205a. More specifically, the memory card control section 217 accesses the memory card 112 to read out the folder(s) and the still picture data and sends them to the TS processing section 204 over the CPU bus 213. In response, the TS processing section 204 writes the received data on the BD 205a while maintaining the hierarchical structure.

Subsequently, in Step S245, the CPU 211 generates a clip on the BD 205a using a predetermined moving picture or still picture, and compiles a playlist associated with the clip. Then, the CPU 211 generates entries of still picture marks in the still picture playlist according to the number of still picture data items copied in Step S246 and sets an index to the entries of respective still picture marks in Step S247.

Hereinafter, the processing steps S245 through S247 will be described in further detail with reference to FIG. 24, which shows the BD 205a that has been subjected to the copying processing. The clip 401 may be still picture data that was stored on a ROM etc., when the recorder 100 was shipped and corresponds to a clip AV stream of moving pictures. This still picture includes a message "play it on a device that can do still picture mark management". This message is posted to alert the user of the device to the possibility that even a device that can play BDs 205a may or may not carry out the processing of this preferred embodiment. It should be noted that if a device that cannot carry out the processing of this preferred embodiment is loaded with the BD 205a, that device cannot analyze the still picture mark (StillPictureMark), which is a new entry for the device, and therefore, can neither analyze nor process the data entry concerning the still picture mark.

As in the clip concerning moving pictures, a playlist 402 is also generated for the clip 401 concerning the still picture and play items 403 are provided for the playlist. In the play items 403, information on the file name of a clip information file, which is a part of the still picture clip 401, and the presentation period of the still picture image thereof (which was actually encoded as moving pictures), may be described. As for the playlist 402 on the other hand, the entry shown as "PlayListMark" in FIG. 10 may be provided, and the playlist mark may include a bookmark, a skip mark and so on, which are identified by the mark types (mark_type).

In this preferred embodiment, still picture marks (StillPictureMark) are newly defined in this playlist mark. The mark types (mark_type) of the still picture marks set a different code from those allocated to a bookmark, a skip mark and other existent marks. Two types of still picture marks, including a still picture mark synchronous with moving pictures (SynchronousStillMark) and a still picture mark asynchronous with moving pictures (AsynchronousStillMark) of the type playing still pictures as slides, are newly defined and provided with mutually different codes.

The CPU 211 sets the same number of still picture marks as that of the still picture data items that have been copied from the memory card 112 onto the BD 205a. In FIG. 24, the arrows pointed to the playlist 402 show the images of still picture mark entries. And the respective marks are given their own numbers (or indices). That is why if a particular index value is given, its associated still picture data item can be found.

In setting the still picture marks, the CPU 211 numbers the still picture marks in a predetermined order, which defines the order in which the still pictures are played as slides. By reference to the attribute information (e.g., the tag information according to the Exif standard) of the copied still picture data, the CPU 211 obtains a time stamp showing the date when the still picture data was generated or the date and time when the still picture data was written. Then, the CPU 211 numbers the still picture data items according to the time stamps such that the oldest one comes first and the newest one comes last and registers the still picture marks sequentially. Then, following the order in which the still picture marks have been registered, the still pictures associated with the marks are played one after another.

Referring back to FIG. 23, in Step S248, the CPU 211 generates an index/address conversion table (StillMap) in which each index is associated with a bit of information that specifies a particular still picture data item on the BD 205a. As used herein, the information that specifies a still picture data item includes a path to the still picture data item, showing in what folder of the hierarchical structure on the BD 205a the still picture data item is stored, and its file name. In Step S249, the CPU 211 stores the generated table (StillMap) right under the BDAV folder of the BD.

As shown in FIG. 24, in the index/address conversion table (StillMap) 404, each of the still picture marks that were set in the playlist 402 can be associated one-to-one with one of the still picture data items that are stored in the DCIM folder of the BD 205a. Hereinafter, the details of the still picture marks will be described with reference to FIGS. 25(a) and 25(b).

As described above, still picture marks synchronous with moving pictures and still picture marks asynchronous with moving pictures are defined herein. In the following description, the entries of still picture marks will be outlined first, and then entries unique to the respective marks will be described.

FIGS. 25(a) and 25(b) show the data structures of two types of still picture marks according to this preferred embodiment. Each still picture mark (StillPictureMark) is defined as an entry of playlist mark shown in FIG. 10 and may be described in the same format as bookmarks, for example.

Each still picture mark includes entries representing a mark type (mark_type), an index that shows uniquely a thumbnail provided for a mark (ref_to_mark_thumnail_index), a still picture index to be an input value for StillMap (ref_to_still_picture_index), a mark time stamp showing time information about the mark (mark_time_stamp) and a presentation period (duration).

The mark type (mark_type) is given a code representing the identity as a still picture mark (such as "AsynchronousStillMark" or "SynchronousStillMark"). As described above, this code is different from a code that is allocated to an existent mark such as a bookmark or a skip mark.

The index (ref_to_mark_thumnail_index) is given uniquely to a mark to identify the thumbnail picture data of that mark.

The still picture index (ref_to_still_picture_index) is an identifier to identify a still picture uniquely, and will also be referred to herein as a "still picture ID". The still picture ID is a serial number to be given to each existent still picture data item right after the still picture data item has been copied from the memory card 112 to the BD 205a, for example.

"mark_time_stamp" showing the location of a mark on the STC time axis is a piece of information showing the presentation/output timing.

The presentation period (duration) shows the duration of the period in which the still picture is presented. The duration is set arbitrarily and may be either specified by the user or have a predetermined fixed length of 5 seconds, for example.

As shown in FIG. 10, the still picture mark is provided in either a real playlist or a virtual playlist. By performing processing that is similar to the mark processing of a moving picture clip AV stream, the recorder 100 can easily analyze the still picture mark and present a menu, for example. As a result, a device that can deal with still picture marks can present both a mark added to a clip and/or a playlist of moving pictures and a still picture mark associated with each still picture at the same time on the menu screen, for example, without eliminating one of the two types. On the other hand, a device that cannot deal with still picture marks can present all marks but still picture marks to be added to a clip and/or playlist of moving pictures on the menu screen, for example.

FIG. 25(a) shows how a still picture mark may be defined to present still pictures sequentially (i.e., as slides). The data of the still picture mark is described as an entry (StillPictureMark) in PlayListMark shown in FIG. 10. As the mark type (mark_type) of this entry, "AsynchronousStillMark" is set to show that this is a still picture mark for use in slide presentation. Optionally, multiple still picture marks may be provided. In that case, the respective still picture marks are given mutually different still picture IDs. The still picture mark shown in FIG. 25(a) is provided so as to make a slide presentation. That is why "mark_time_stamp" corresponding to the presentation time is invalid in this case and is zero. This is because if slide presentation is supposed to be performed, there is no need to set the presentation times to present the respective still pictures sequentially within a predetermined presentation period. And a value greater than zero is set as the presentation period (duration).

FIG. 25(b) shows how a still picture mark may be defined to present moving pictures and a still picture in combination.

This still picture mark is provided so as to be presented between the playbacks of moving pictures. As the mark type (mark_type), "SynchronousStillMark" is set. Optionally, multiple still picture marks shown in FIG. 25(b) may be provided, too. In that case, the respective still picture marks are given mutually different still picture IDs. "mark_time_stamp" describes valid information about the time to present the still picture. This value is set on the STC time axis representing the reference time of moving picture playback. That is why moving pictures and a still picture can be presented in combination under proper time setting. A value greater than zero is set as the presentation period (duration). The still picture of the "SynchronousStillMark" type is presented for the period of time represented by "duration" from the time specified by "mark_time_stamp". And then moving pictures, which should be played back after the time specified by "mark_time_stamp", starts to be played back.

In the example described above, the number given as a still picture ID is supposed to be stored in the field called "ref_to_still_picture_index". Alternatively, the number may be stored in the field called "ref_to_menu_thumbnail_index" shown in FIGS. 25(a) and 25(b). Also, although the still picture ID is made reference to in FIGS. 25(a) and 25(b), reference may also be made to non-still-picture data instead of, or in addition to, the still picture ID. For example, as well as the still picture files, audio (or music) files and their associated IDs (audio_index) are prepared. And in the still picture mark shown in FIG. 25(a), "ref_to_audio_index" is provided in parallel with the "ref_to_still_picture_index" field and its ID is spcified. Then, that audio file will be made reference to, and background music will be provided, during the slide show of the respective still pictures. It should be noted that audio files are just an example. As another example, a text file may be used to add description to the still pictures.

FIG. 26 shows the correspondence of the index/address conversion table (StillMap) 404. The conversion table 404 defines correspondence between thumbnail indices (still picture IDs) to identify the respective still pictures uniquely and the file names with full-path description. As used herein, the "file name with full-path description" refers to a file name that shows a folder path from the root of the hierarchical structure of the BD 205a to the storage location of that file. In the following description, the information about the name of a still picture file and the path leading to that file will be referred to herein as "still picture data specifying information".

The conversion table 404 is compiled such that the still picture ID field 405 is associated with the entries representing the still picture data specifying information. An entry representing the still picture data specifying information is made up of a path entry 406a and a file entry 406b. The path entry 406a stores information about a path leading to the files (path information). In the path entry 406a, the path information is not stored for each file but only a single piece of path information is described in common for multiple files. In the file entry 406b on the other hand, the respective file names are stored.

For example, in FIG. 26, the files with the names "DSC0000x.JPG (where x=1, 2, 3, and so on)" share the same path information "DCIM¥101SDDCF¥". That is why only the single piece of information "DCIM¥101SDDCF¥" is described in the path entry 406a for the multiple files. According to the DCF standard, the maximum number of still picture files that can be stored per DCF directory is 9999, and a huge number of still picture files are stored on the same path. StillMap does not describe the same path information over and over again for every file entry. For that reason, compared to describing the path information for every file entry, the conversion table 404 can be compiled of a much smaller amount of information. The specific data structure of the conversion table 404 will now be described with reference to FIG. 27.

FIG. 27 shows an exemplary data structure of the index/address conversion table (StillMap) 404. The still picture ID and the still picture data specifying information described above are defined in StillMap( ) field 270, which is in turn defined by two "for" syntaxes.

The first "for" syntax of the StillMap( ) field 270 defines a path entry 406a. In the path entry syntax, a folder name is described in the field 271. This folder name includes not just the name that has been given to the folder in question but also the path from the root of the file system of the BD 205a to the folder's location where the still picture file is stored. In the field 272 on the other hand, the file ID (e.g., the smallest file ID) of the first one of multiple file entries that the folder has may be described. The file ID will be described later.

The second "for" syntax of the StillMap( ) field 270 defines the still picture ID and the file entry 406b of each still picture file. More specifically, the still picture ID is described in the field 273 of this "for" syntax and the still picture file name associated with the still picture ID is described in the field 274. Each associated pair of still picture ID and still picture file name are given the same file ID (file_id). That is why if a still picture ID has been given, a still picture file name having the same file ID as the still picture ID can be identified uniquely. The still picture ID shown in the Still_picture_index of the field 273 is referred to in "ref_to_still_picture_index" shown in FIGS. 25(a) and 25(b).

FIG. 28 shows the procedure of performing still picture slide presentation processing using the conversion table 404. In this example, the slide presentation is supposed to be carried out by reference to the still picture mark provided for the playlist 402 of the clip 401 consisting of still pictures only as shown in FIG. 24. Such a still picture mark is defined in the format shown in FIG. 25(a). First, in Step S290, the CPU 211 receives an instruction to start presenting still pictures from the user by way of the instruction receiving section 215. This instruction may be given by the user, who has confirmed a still picture (or a smaller-sized one thereof) being presented along with a thumbnail picture of a moving picture clip AV stream, by way of the instruction receiving section 215, for example.

Next, in Step S291, the CPU 211 checks the code showing the identity as a still picture mark by the value of the mark type (mark_type) that has been entered in the still picture mark (StillPictureMark) and then finds a thumbnail index. Subsequently, in Step S292, the CPU 211 consults the conversion table (StillMap) with the thumbnail index, thereby finding a file name with its full-path description. Thereafter, in Step S293, still picture data with the specified file name is read from the BD 205a under the instruction of the CPU 211. The decoder 206 decodes that still picture data and outputs still pictures to the TV 106, for example. When the period (duration) described in the still picture mark (StillPictureMark) passes, the CPU 211 stops outputting the still pictures.

Then, in Step S294, the CPU 211 determines whether or not all still pictures have been presented yet. More specifically, the CPU 211 determines whether or not all still picture mark (StillPictureMark) entries in that playlist have been processed. If not all still pictures have been presented yet, the process advances to Step S295, in which the CPU 211 gets the thumbnail index of the next still picture mark. After that, the process goes back to Step S292, thereby performing the same series of processing steps all over again until all still pictures have been presented. And the process will end when every still picture has been presented.

The processing described above is supposed to be carried out by reference to the still picture mark shown in FIG. 24. Alternatively, by setting the still picture mark in a playlist for a moving picture clip, the moving pictures and still pictures may be presented in combination on the same screen. In that case, the still picture mark synchronous with moving pictures (SynchronousStillMark) shown in FIG. 25(b) is set. The still picture marks synchronous with moving pictures may be generated by the recorder automatically following the order the pictures were shot by reference to the moving picture recording start date/time information and the shooting date/time information showing the date and time when the still pictures were shot. This point will be described more fully below.

FIG. 29(a) shows a BD 205a on which moving pictures and still pictures are stored in combination. There are clips 501a and 501b representing Moving Pictures #1 and #2, respectively, and a playlist 502 is provided so as to manage a playback that covers both of these clips 501a and 501b. The playlist 502 includes two play items 503a and 503b.

Hereinafter, the procedure of settings to be done to get still pictures and moving pictures presented in combination on the same screen will be described. An example in which the user sets still picture marks by him- or herself will be described first. And then an example in which the recorder 100 sets still picture marks automatically will be described.

The user may set the still picture marks in the following procedure. After the still picture data has been copied from the memory card 112 onto the BD 205a, the user may get the still pictures presented before or after the moving pictures are played back. In FIG. 29(a), the "predetermined still pictures" are supposed to be Still Picture #1 (¥DCIM¥101SDDCF¥DSC00001.JPG) and Still Picture #2 (¥DCIM¥102SDDCF¥DSC00320.JPG).

The still picture mark shown in FIG. 25(b) may be generated in the following procedure. First, the user specifies Still Picture #1 to be presented in association with a moving picture and its presentation/output time, which may be set before the moving picture starts to be played back and output. Then, the CPU 211 defines the presentation/viewing time of Still Picture #1 by the PTS of Moving Picture #1 and sets the PTS as a PTS entry of the still picture mark (StillPictureMark). The CPU 211 also sets a thumbnail index that is linked to Still Picture #1. The presentation period (duration) that has been either specified by the user or determined in advance is also defined as presentation period (duration). As a result, a still picture mark that manages the presentation of Still Picture #1 by the playback of Moving Picture #1 is set. Similar settings are done for Still Picture #2, too. As for Still Picture #2, however, its presentation/output time is supposed to be set after Moving Picture #1 has been played back and output and before Moving Picture #2 starts to be played back and output.

FIG. 29(b) shows the presentation order of the still pictures and moving pictures that has been set in FIG. 29(a) and also show how the system time clocks STC change. The system time clock STC is generated by the decoder 206 as a reference operation time and its count is controlled. To generate the system time clock STC, the configuration to get the count information generated by the clock counter 262 and the PLL circuit 263 of the TS processing section 204 shown in FIG. 6 is also needed.

As shown in the upper half of FIG. 29(b), Still Picture #1 is presented first for a predetermined period of time, and then Moving Picture #1 starts to be played back. After Moving Picture #1 has been played back, Still Picture #2 is presented for a predetermined period of time and then Moving Picture #2 is played back. Meanwhile, as shown in the lower half of FIG. 29(b), the system time clocks STC are not counted (have a pause) while Still Pictures #1 and #2 are being presented but are counted while Moving Pictures #1 and #2 are being played back. The clocks are counted during the playback of Moving Pictures #1 and #2 because the STCs are used as a reference to determine the playback/output timings of video and audio. That is to say, if the PTS defined for video data and audio data agrees with the system time clock STC, the video data and the audio data are played back and output. On the other hand, while Still Pictures #1 and #2 are being presented, counting the STCs needs to be stopped. This is because if the STCs continued to be counted, the presentation timings of the moving pictures would shift. That is why the processing of controlling the STC counts as shown in FIG. 29(b) is needed.

Next, it will be described how the recorder 100 sets the still picture marks automatically.

Just after the still picture data has been copied from the memory card 112 onto the BD 205a, the CPU 211 of the recorder 100 gets the time stamps representing the dates and times when all still picture data were generated or stored. These time stamps may be obtained from the tag information compliant with the Exif standard, for example. And the respective still picture data items are sorted by the time stamps such that the still picture data with the oldest time stamp comes first and that the still picture data with the newest time stamp comes last.

Next, the CPU 211 acquires information about the times when the moving pictures actually started and finished being recorded. The start time is supposed to be described in the first program map table packet PMT_TSP in the clip AV stream. The program map table packet PMT_TSP is inserted into the stream approximately every 0.1 second, and therefore, can be regarded as indicating the moving picture recording start time substantially exactly. On the other hand, the moving picture recording end time may be calculated by adding the playback duration to its start time.

The playback duration may be the difference between the time representing the top of a moving picture and the time representing the end of that moving picture, for example. The time representing the top of a moving picture may be set at or before the start time (In_time) of the play item shown in FIGS. 9(b) and 10 or may also be the stream presentation start time (Presentation_start_time) that is defined by the sequence information (SequenceInfo) in the clip information file 84 shown in FIG. 11. In the same way, the time representing the end of a moving picture may be set at or after the end time (Out_time) of the play item or may also be the stream presentation end time (Presentation_end_time) shown in FIG. 11. If these times are represented as PTS, the playback duration can be figured out by dividing the difference between the PTS by its precision (i.e., the frequency). In the following description, the actual recording start time of a moving picture will be simply referred to herein as a "start time" and the actual recording end time will be referred to herein just as an "end time".

If the time stamp of the still picture data is earlier than the moving picture start time, then the CPU 211 sets the PTS, corresponding to the moving picture start time, as "mark_time_stamp" of the still picture mark shown in FIG. 25(b). If there are a number of such still picture data items, then the same PTS is used as "mark_time_stamp" of their associated still picture marks. When the same PTS is used, the still pictures are presented in the order in which the still picture marks were generated (i.e., in the order in which the still picture marks are arranged in FIG. 25(b)). For that purpose, the CPU 211 generates the still picture marks in the order of the time stamps of the still picture data items such that the still pictures are presented in their shooting order.

On the other hand, if the time stamp of the still picture data is between the start time and the end time of the moving picture, then the CPU 211 sets the PTS, corresponding to the moving picture playback time associated with the time stamp, as "mark_time_stamp" of the still picture mark. If the moving picture and the still picture were shot using different cameras, then their shooting times may overlap with each other. Even so, the pictures can still be presented in their shooting order.

And if the time stamp of the still picture data is later than the moving picture end time, then the CPU 211 sets the PTS, corresponding to the moving picture end time, as "mark_time_stamp" of the still picture mark shown in FIG. 25(*b*). If there are a number of such still picture data items, then the CPU 211 generates the still picture marks in the order of the time stamps of the still picture data. As in the example described above, the still pictures are presented in the order in which the still picture marks were generated (or arranged).

If there are a number of moving pictures (which will be referred to herein as "Moving Picture #1" and "Moving Picture #2" in the shooting order), either the PTS corresponding to the end time of Moving Picture #1 or the PTS corresponding to the start time of Moving Picture #2 may be defined as "mark_time_stamp" of the still picture mark. However, it is easier to adopt the former type of processing than the latter because if the latter type of processing is adopted, then the processing of recognizing Moving Picture #2 in advance (i.e., the operations of analyzing and retaining the result) needs to be performed. And if no Moving Picture #2 has been recognized, then the modes of processing need to be switched into the former type, thus complicating the processing overly. In the example described above, the still picture marks are supposed to be set for every still picture data. Alternatively, the user may specify the still pictures for which the still picture marks should be provided.

When the recorder 100 generates the still picture marks automatically, the presentation periods of the respective still pictures are also defined automatically. Those periods may be either specified by the user in advance or predefined when the recorder 100 is shipped from the factory. The presentation periods are defined as "duration" shown in FIG. 25(*b*).

If the still picture marks are set by the recorder 100, counting of the system time clocks STC may or may not be stopped while the still pictures are being presented. However, if the still pictures are presented while the moving pictures are being played back, then the STCs may continue to be counted with the playback of the moving pictures respected. In that case, both the still pictures and moving pictures will be output at the same time. However, the still pictures may be subjected to α-blending or any other appropriate type of image processing so as to be superposed on the video.

By providing a playlist in which the still picture marks have been set in the procedure described above, even if a moving picture and a still picture have been shot with different devices, the moving picture and the still picture can still be presented in the shooting order. This is very convenient for the user because he or she can enjoy the pictures and video without making any special troublesome manipulations. This advantage can also be achieved in quite the same way by a camcorder that can take still pictures while shooting a moving picture.

In the situation where a moving picture and a still picture have been shot with two different devices, there may be a lag between the time settings of those devices even if no delay has been caused. In that case, no accurate time stamps will be added, and therefore, the moving picture and the still picture cannot be presented in the actual shooting order. To eliminate such a lag, the user usually makes editing. In the editing, if the user has shifted the time stamp of the still picture data (e.g., "mark_time_stamp" shown in FIG. 25(*b*)) by a certain amount of time, then the CPU 211 makes a correction such that the time stamps of the other still pictures are also shifted by the same amount of time. And the still picture marks may be generated by reference to the corrected time stamps. Then, there will be no need for the user to correct the time stamps one by one, thus increasing the efficiency of editing. Optionally, to eliminate such a time lag between the devices, the time setting of one of the two devices may be adjusted to that of the other according to the Blue tooth standard, for example. Alternatively, the time settings of two devices may be adjusted to each other by making each of the two devices adjust its time using radio waves of a radio clock, for example. Furthermore, if at least one still picture is shot while a moving picture is being shot, the shooting time lag between the recorder that shot the still picture and the recorder that shot the moving picture can be eliminated by adjusting the time point of the still picture in the moving picture sequence (i.e., the PTS value on the PTS time axis of the moving picture sequence). Conversely, if a still picture and a moving picture are presented synchronously with each other, the time lag may be eliminated by giving an indication to, or prompting, the user to shoot at least one still picture while shooting a moving picture.

Figure 29:
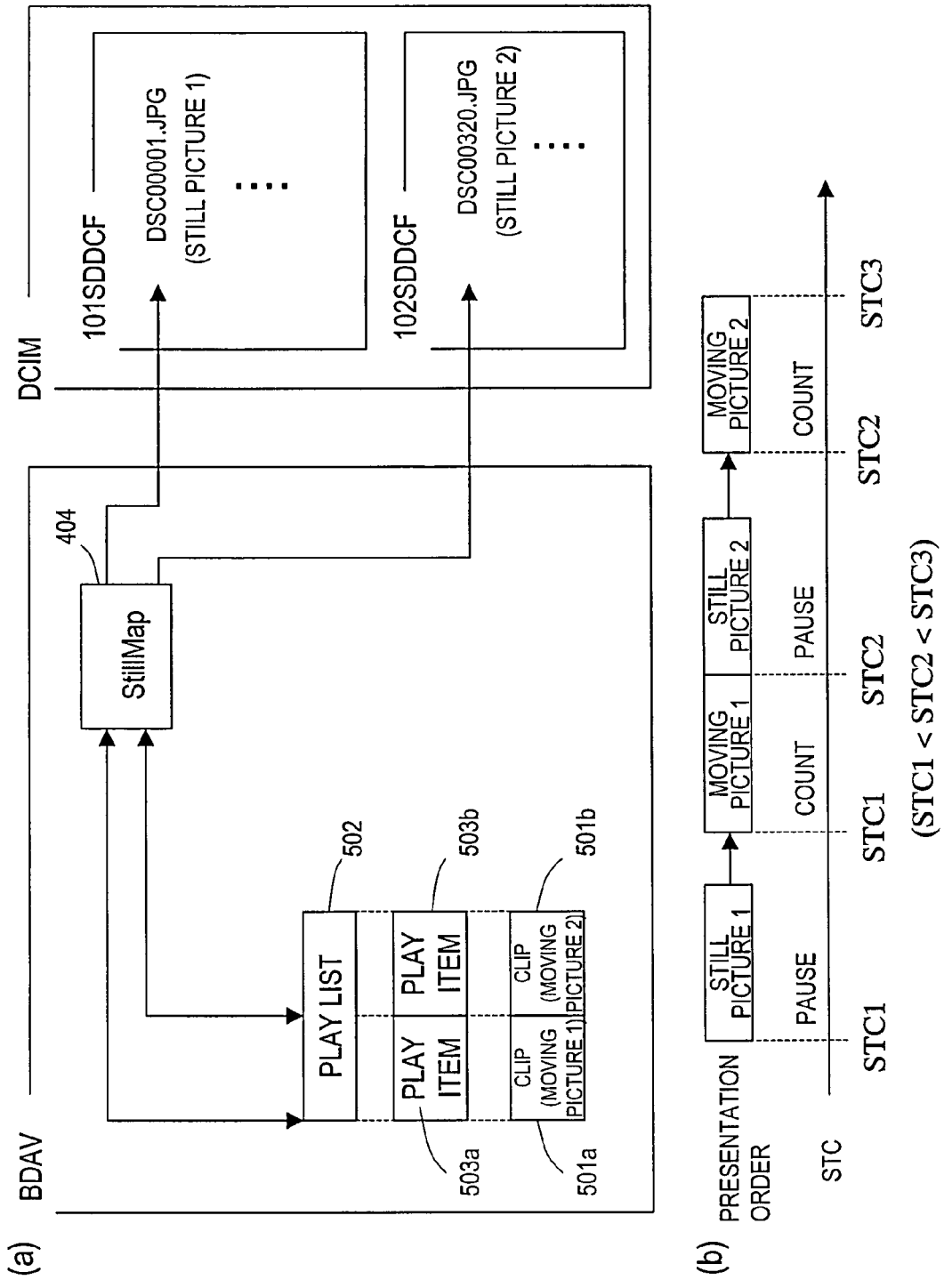

As is clear from the foregoing description, the still picture mark to make a slide presentation (see FIG. 25(*a*)) and the still picture mark to present a moving picture and a still picture in combination (see FIG. 25(*b*)) are not set for the same clip or play item (see FIGS. 24 and 29, for example). However, if a playlist is used, the still picture marks shown in FIGS. 25(*a*) and 25(*b*) can be used at the same time. In that case, a flag showing which of the two still picture marks shown in FIGS. 25(*a*) and 25(*b*) is defined may be provided so that the type of the still picture mark can be recognized easily. Then, there is no need to check the types of the still picture marks anymore.

In the preferred embodiment described above, the entries of still picture marks are supposed to be provided under the playlist marks (PlayListMark) in the real playlist or the virtual playlist. However, the entries of still picture marks do not have to be provided within the playlist mark (PlayListMark). For example, the still picture marks may be automatically generated as clip marks.

Alternatively, each entry of still picture may also be provided as one of the play items (see FIG. 10) of the playlist information (PlayList). The items in the play item are the entries that have already been described for this preferred embodiment, i.e., the file name of the clip information file, the number of still pictures, the indices to the respective still pictures, the presentation periods (durations) of the still pictures, and play item type information showing the identity as a play item for still pictures. Even so, the file name of each still picture and the path leading to that file can be obtained by using the index/address conversion table (StillMap). By providing the still picture as one of play items, the still picture can be managed along with moving picture related play items within the same playlist. Optionally, the entry of still picture marks may also be separately provided within the clip information.

INDUSTRIAL APPLICABILITY

The data processor of the present invention can manage moving pictures and still pictures efficiently by extending a data structure for storing moving picture data. Since the processing that is defined for moving pictures can also be used to process still pictures, the thumbnail pictures of moving picture data and still picture data (or smaller-sized pictures thereof) can be presented in combination on the same screen.

The invention claimed is:

1. A data processor configured to record at least one moving picture file containing moving picture data in a moving picture folder created in a root directory of a storage medium, the data processor comprising:
 a drive unit for creating a still picture folder in the root directory, the drive unit creating a plurality of sub-folders in the still picture folder, and writing a plurality of still picture files in the plurality of sub-folders, respectively; and
 a control section for generating file specifying information that specifies the storage location of each said still picture file, for generating identification information for identifying each said still picture file uniquely, and for compiling a table that associates the file specifying information and the identification information with each other,
 wherein the drive unit writes, in a folder that is within the root directory and that is different from the still picture folder, a table file containing the table.

2. The data processor of claim 1, wherein the control section generates, as the file specifying information, path information about a path leading to each said still picture file and a file name of each said still picture file.

3. The data processor of claim 2,
 wherein for the still picture files, the control section generates a piece of the path information about a path leading to each said sub-folder and the file names of the still picture files as the file specifying information.

4. The data processor of claim 1, wherein the control section generates a still picture mark for each of at least one of the plurality of still picture files,
 the drive unit writes a management information file containing the still picture mark as an entry,
 wherein the control section stores type information in each said entry of the still picture mark in the management information file to indicate that the entry is related to presentation of only still picture files.

5. The data processor of claim 4, wherein the control section stores presentation period information in each said entry of the still picture mark in the management information file to define the presentation period of a still picture of its associated still picture file.

6. The data processor of claim 1, wherein the moving picture folder includes a sub-folder, in which at least one moving picture file, containing moving picture data, is stored, and
 wherein the control section further generates entries, which are associated with the respective moving picture files, in a management information file, each said moving picture entry including information about the file name of a clip information file which is associated with the associated moving picture file and information about the presentation start time and the presentation end time of the moving picture.

7. The data processor of claim 6, wherein the control section generates a still picture mark for each of at least one of the plurality of still picture files,
 wherein the drive unit writes a management information file containing the still picture mark as an entry, and
 wherein the control section stores type information, showing identity as an entry about synchronous playback of a moving picture and a still picture, in each said entry of the still picture mark.

8. The data processor of claim 7, wherein the control section stores time information, representing a still picture presentation time for presenting the still picture synchronously with the playback of the moving picture, in each said entry of the still picture mark, and
 wherein the time information is defined based on the moving picture's time information that is added to the moving picture data to play back the moving picture.

9. The data processor of claim 1, wherein the drive unit writes the at least one still picture file on the storage medium using a blue semiconductor laser.

10. The data processor of claim 9, wherein the drive unit writes the at least one still picture file in a level that is lower in hierarchy than the still picture folder and that complies with the DCF standard.

* * * * *